May 10, 1960 S. UNTERMYER 2,936,273
STEAM FORMING NEUTRONIC REACTOR AND METHOD OF OPERATING IT
Filed June 28, 1955 14 Sheets-Sheet 1

INVENTOR.
Samuel Untermyer
BY
Roland A. Anderson
Attorney

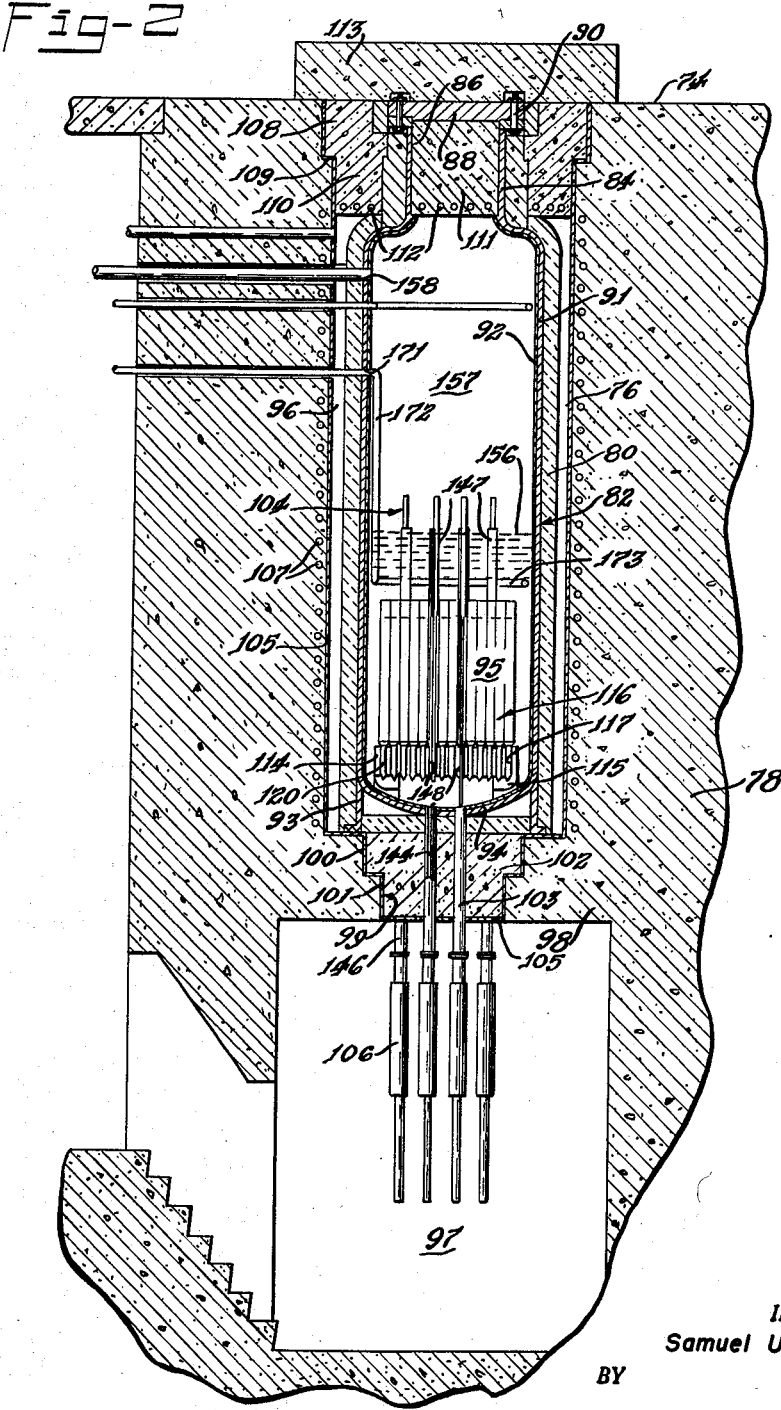

May 10, 1960 S. UNTERMYER 2,936,273
STEAM FORMING NEUTRONIC REACTOR AND METHOD OF OPERATING IT
Filed June 28, 1955 14 Sheets-Sheet 3
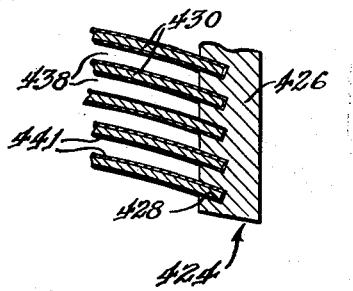
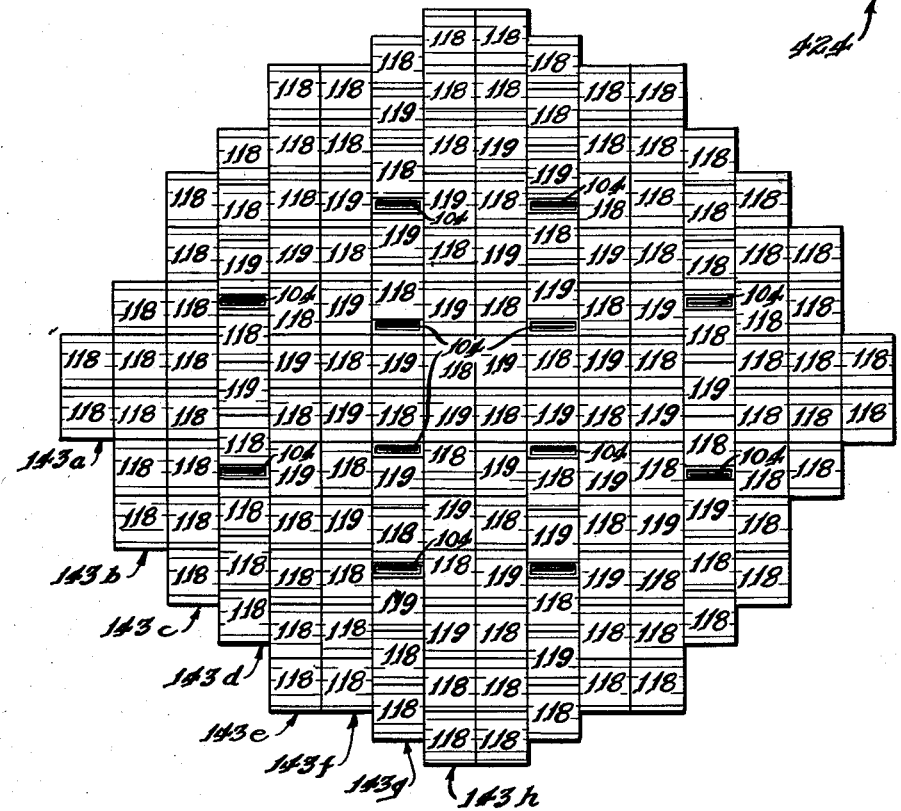
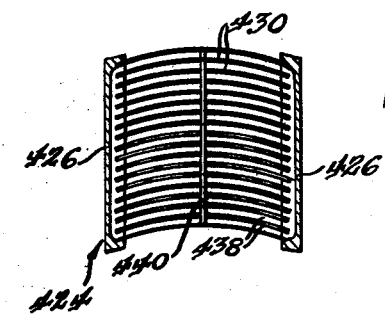
INVENTOR.
Samuel Untermyer
BY
Roland G. Anderson
Attorney May 10, 1960 S. UNTERMYER 2,936,273
STEAM FORMING NEUTRONIC REACTOR AND METHOD OF OPERATING IT
Filed June 28, 1955 14 Sheets-Sheet 4
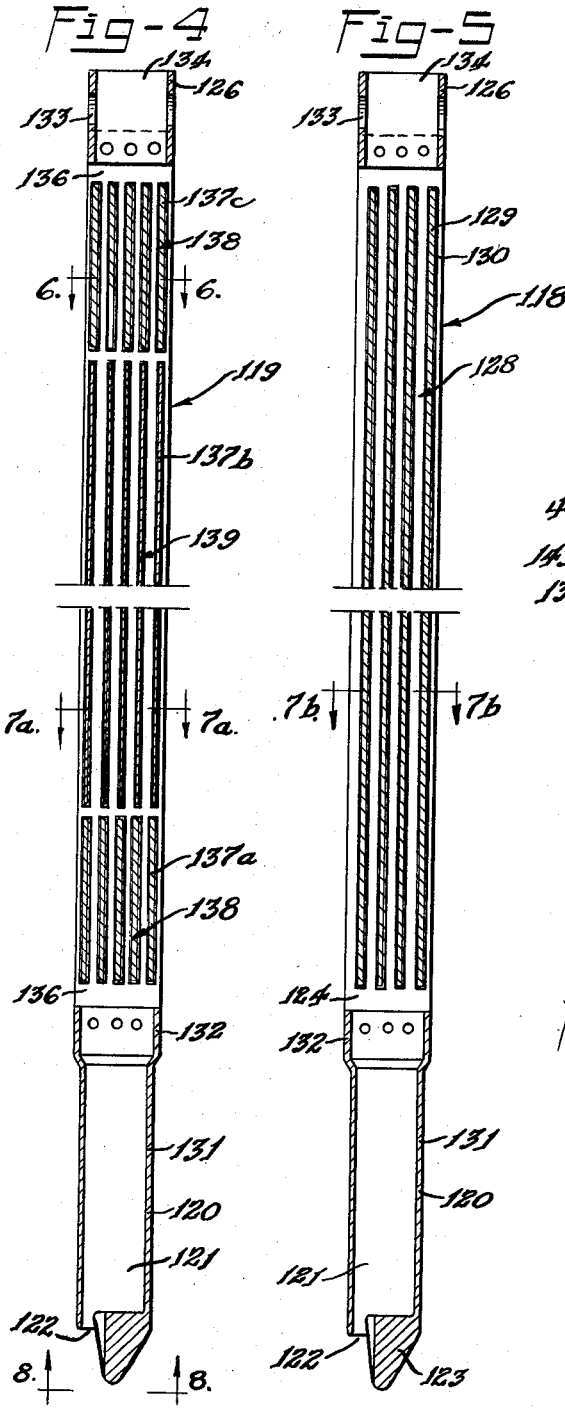
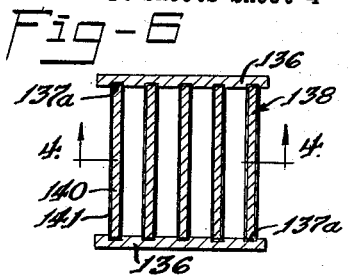
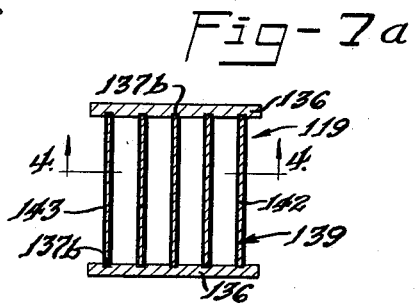
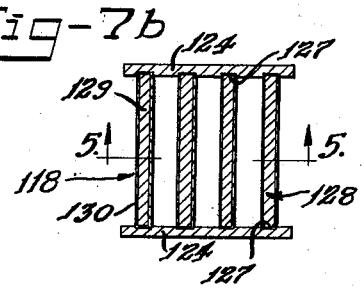
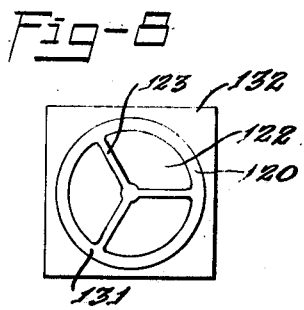
INVENTOR.
Samuel Untermyer
BY
Attorney

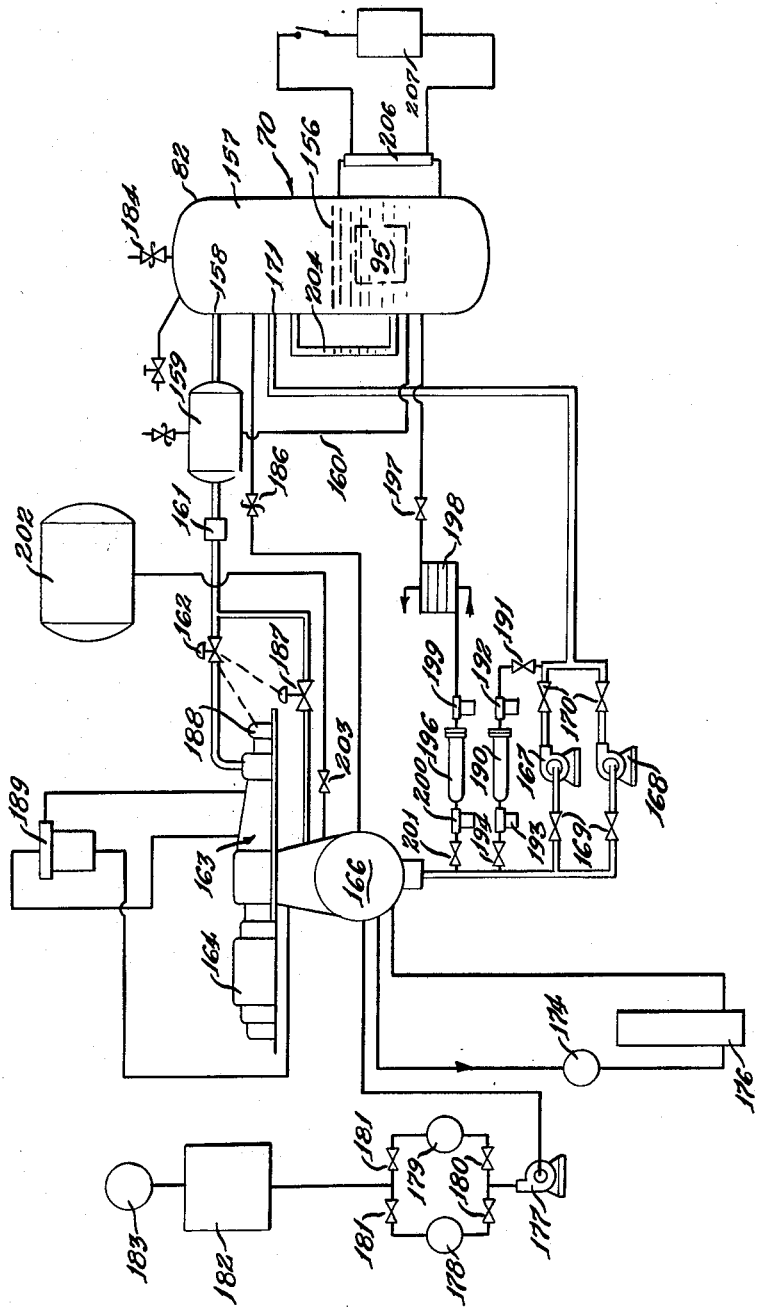

May 10, 1960 S. UNTERMYER 2,936,273
STEAM FORMING NEUTRONIC REACTOR AND METHOD OF OPERATING IT
Filed June 28, 1955 14 Sheets-Sheet 7

INVENTOR.
Samuel Untermyer
BY
Roland G. Anderson
ATTORNEY

May 10, 1960 S. UNTERMYER 2,936,273
STEAM FORMING NEUTRONIC REACTOR AND METHOD OF OPERATING IT
Filed June 28, 1955

INVENTOR.
Samuel Untermyer
BY
ATTORNEY

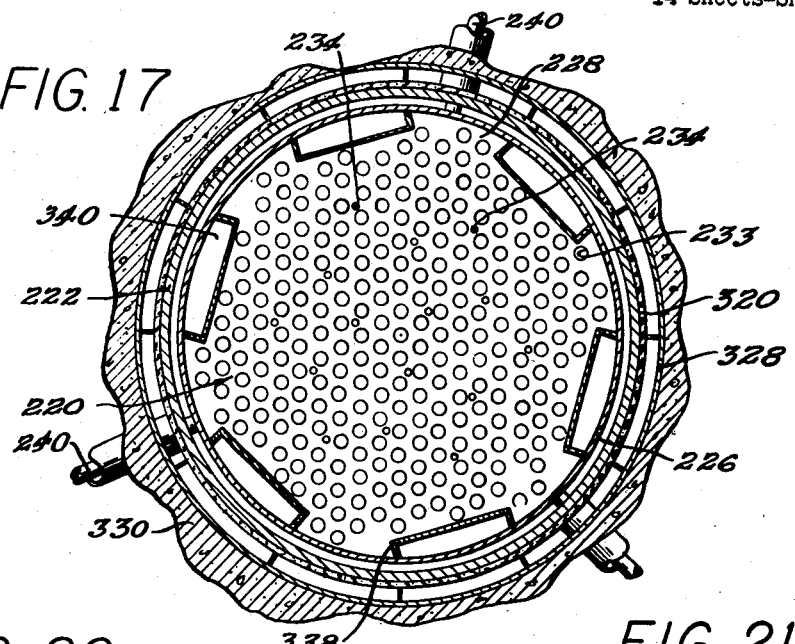
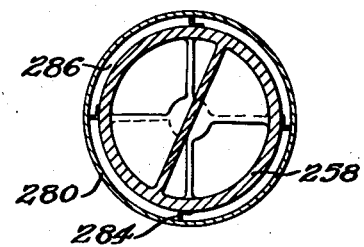
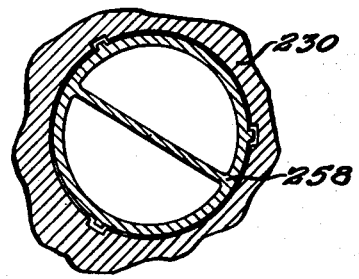
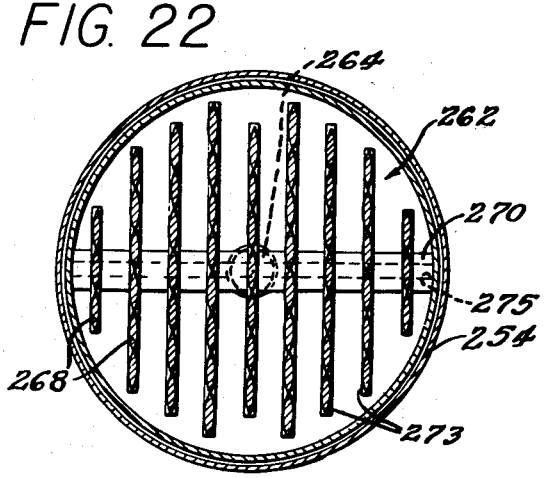

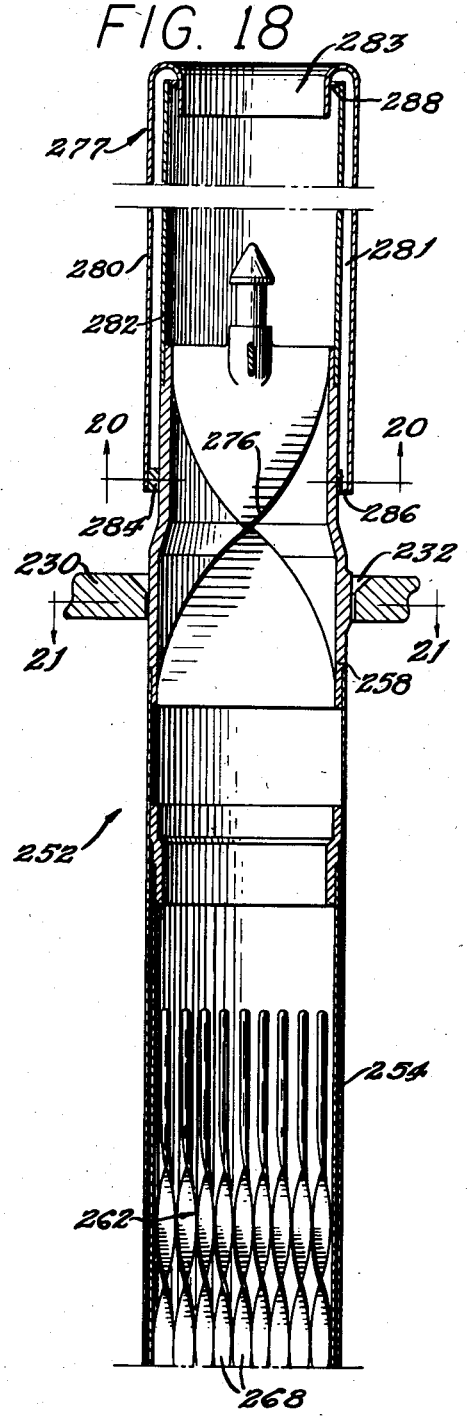
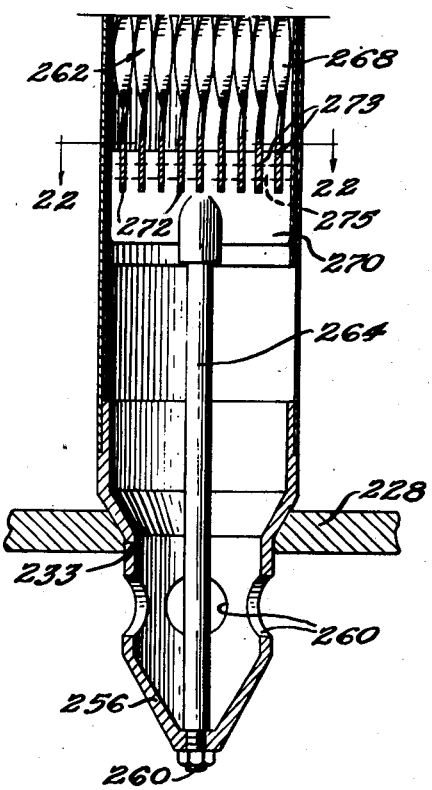

May 10, 1960     S. UNTERMYER     2,936,273
STEAM FORMING NEUTRONIC REACTOR AND METHOD OF OPERATING IT
Filed June 28, 1955     14 Sheets-Sheet 11

INVENTOR.
Samuel Untermyer
BY
Roland A. Anderson
ATTORNEY

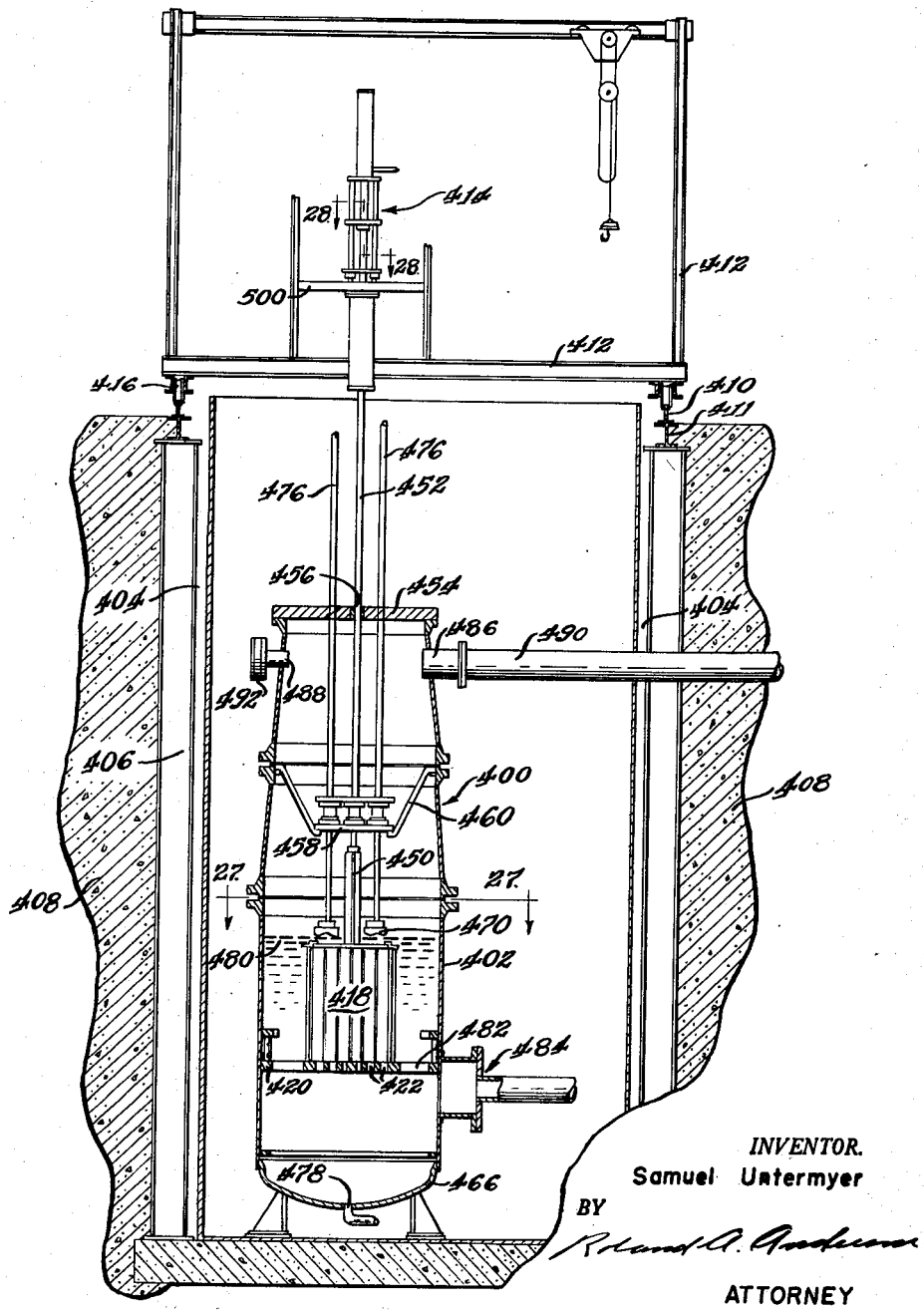

May 10, 1960     S. UNTERMYER     2,936,273
STEAM FORMING NEUTRONIC REACTOR AND METHOD OF OPERATING IT
Filed June 28, 1955     14 Sheets-Sheet 13
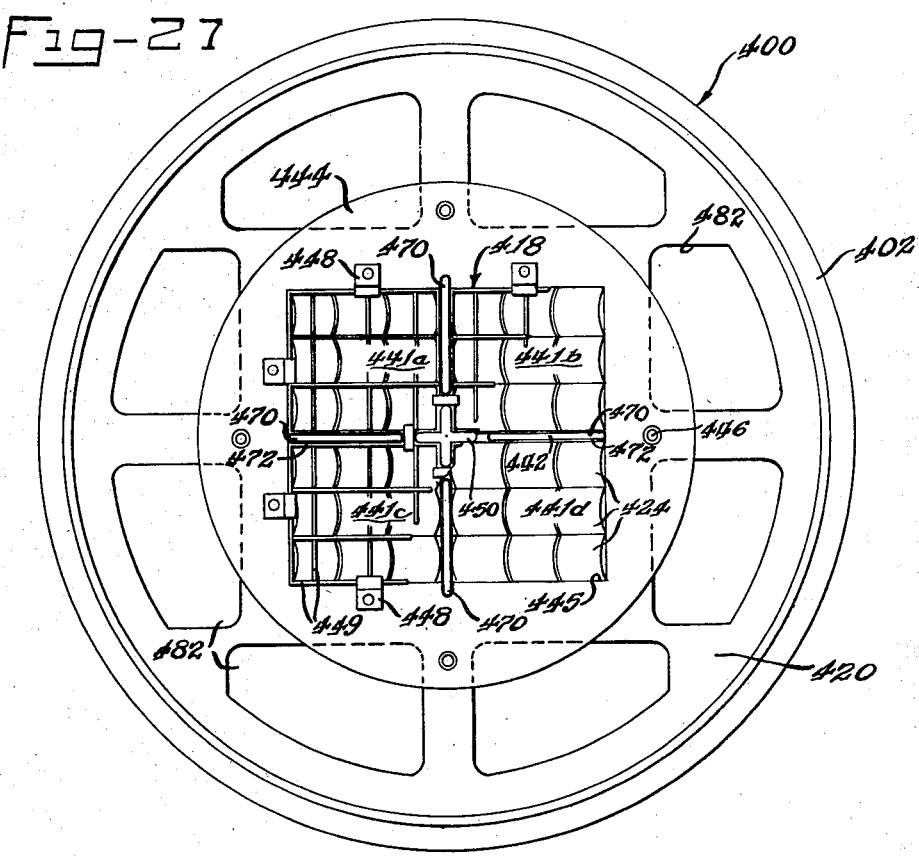
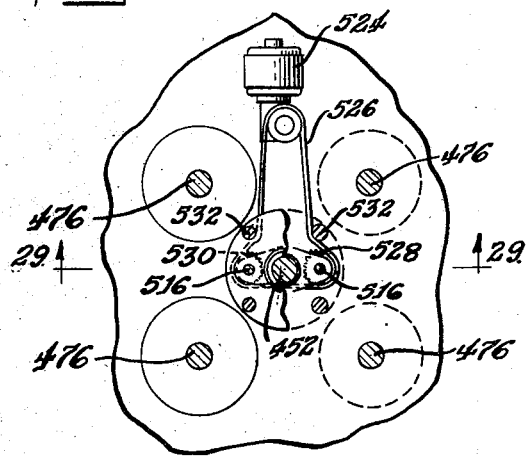
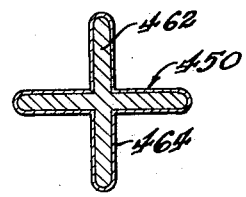
INVENTOR.
Samuel Untermyer
BY
Attorney May 10, 1960  S. UNTERMYER  2,936,273
STEAM FORMING NEUTRONIC REACTOR AND METHOD OF OPERATING IT
Filed June 28, 1955  14 Sheets-Sheet 14
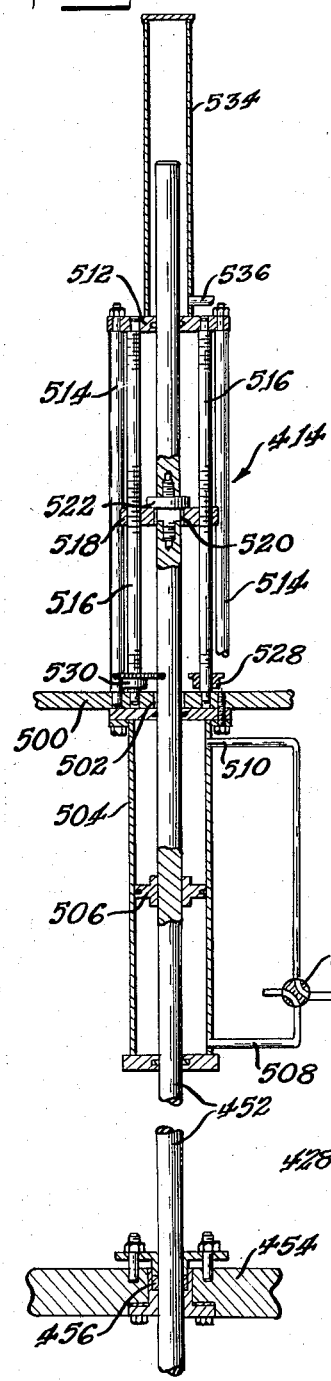
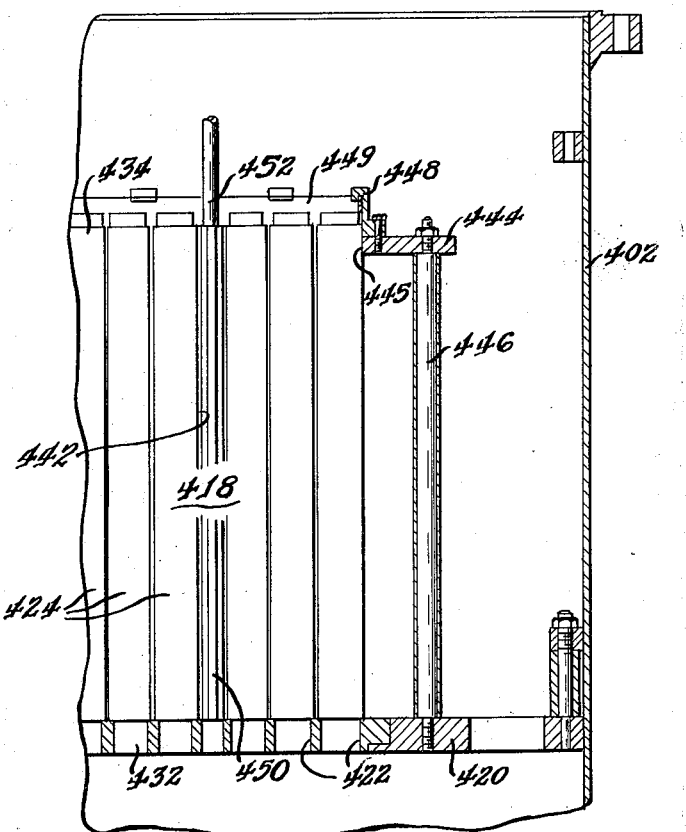
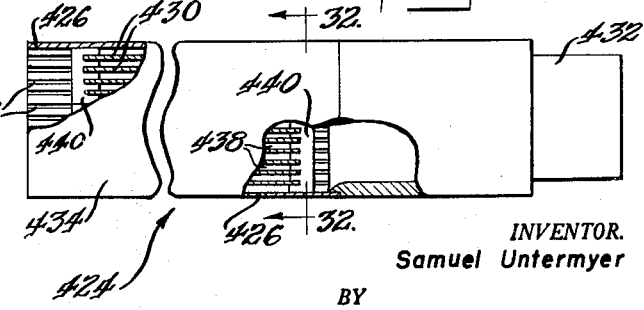
INVENTOR.
Samuel Untermyer
BY
Attorney

United States Patent Office 2,936,273
Patented May 10, 1960

2,936,273

STEAM FORMING NEUTRONIC REACTOR AND METHOD OF OPERATING IT

Samuel Untermyer, Scotia, N.Y., assignor to the United States of America as represented by the United States Atomic Energy Commission Application June 28, 1955, Serial No. 518,427

13 Claims. (Cl. 204—154.2)

The present invention relates to neutronic reactors and to methods of operating neutronic reactors, and more particularly to neutronic reactors and methods of operating reactors for the production of useful power.

Prior to the present invention, every effort was made to prevent the formation of bubbles within the active portion of a reactor. This was done in spite of the fact that more heat can be removed by water which is converted into steam than can be removed by water flowing through the region of heat generation without converting the water to steam.

One of the reactors known to the art removes thermal energy from the active portion of the reactor by flowing a liquid coolant under pressure through the active portion of the reactor and flashing the liquid coolant into vapor exterior to the active portion of the reactor (patent application Serial No. 628,320, filed November 13, 1945, entitled "Power Means and Method," by Harcourt C. Vernon), now Patent No. 2,825,688. In another reactor known to the art, liquid water is circulated through tubes extending through the active portion of a reactor and pressure reducing nozzles are disposed in the inlet ends of the tubes adjacent to an inlet manifold. In the event of the formation of steam bubbles in a tube, the flow rate of the coolant through that tube decreases, and the pressure drop across the nozzle decreases placing the entire manifold pressure on the tube in order to sweep bubbles out of the active portion of the reactor.

The reason that boiling of a liquid within the active portion of the reactor was considered to be undesirable is that bubbling would affect the reactivity of the reactor and make steady control of the reactor difficult (Science and Engineering of Nuclear Power, edited by Clark Goodman, Addison-Wesley Press, Inc., copyright 1947, page 303). The formation of vapor bubbles within the active portion of a reactor reduces the density of the liquid therein, and as a result the effect of the liquid upon the reactivity of the reactor is changed. Further, the formation and termination of bubbles in a liquid medium does not proceed at a smooth, uniform rate. For these reasons, it was believed prior to this invention that a neutronic reactor could not be operated with a boiling liquid in the active portion of the reactor and maintained under control.

The inventor has found that under certain conditions, reactors may be operated to produce vapor directly in the active portion of the reactor, and that the vapor so produced can be directly used to perform useful work. The inventor has found that under certain conditions, the formation of vapor bubbles as a result of a neutron flux excursion from the injection of a reactivity increment into the reactor will operate to nullify the reactivity increment within a sufficiently short period of time to prevent unsafe reactor operating conditions from developing.

A reactor which behaves in this manner is a self-regulating reactor. Self-regulating reactors are those reactors which utilize an inherent physical property to offset changes in reactivity which are injected into the reactor. Bubble formation, or void formation, is only one physical property which can accomplish self-regulation. A reactor may be constructed in which a reactivity increment changes the temperature of a reactor and the change in temperature in turn nullifies the reactivity increment. This is another example of a self-regulating reactor. On the other hand, there are auto-catalytic reactors in which an increase in reactor power causes an increase in reactivity resulting in a further increase in reactor power. The effect of temperature on reactivity may again be used to achieve an auto-catalytic reactor, since reactors can be constructed in which an increase in the temperature of the reactor further increases the reactivity of the reactor.

Throughout this disclosure, the definitions used are those conventionally used in the art as exemplified by "The Elements of Nuclear Reactor Theory," by Glasstone and Edlung (1952), D. Van Nostrand Company, Inc. Some of the more frequently used terms used herein are defined as follows.

The neutron multiplication factor, designated by the symbols "K," or K∞, defines the ratio of the number of neutrons in one generation to the number of neutrons in the preceding generation of a reactor of infinite size with its control elements positioned for maximum reactivity. The neutron multiplication factor of a reactor is a function of the reactor materials and the disposition of these materials, and not a function of the mode of operation of the reactor.

The neutron reproduction ratio of the reactor, designated "$K_{eff}$" or "$r$," is the ratio of the number of neutrons in one generation to the number of neutrons in the preceding generation within a finite reactor structure, including the effects of the control mechanism for the reactor. The neutron reproduction factor is always smaller than the neutron multiplication ratio due to the fact that it takes into account the finite size of the reactor, and also is reduced by the effect of the control mechanism upon the reactor.

The reactivity of a reactor, designated $\rho$, is defined by the expression $$\rho = \frac{K_{eff}-1}{K_{eff}}$$

the maximum reactivity of the reactor, $\rho_{max}$, being the case in which $K_{eff}$ is measured with the control mechanisms out of the reactor in the position of maximum reactivity.

The term "steam forming liquid" is a generic term for water and heavy water. The term "reactivity increment" is used to denote a reactivity fraction, and is generally used in this specification to describe the insertion of a reactivity fraction to create reactor operating conditions under a condition of K excess, K excess being defined as $K_{eff}-1>0$.

The "active portion" of a reactor is the region within the reactor shield including the fissionable material and moderator material for the reactor. Generally, the active portion has a core and a reflector surrounding the core, and in "breeder" type reactors it may include one or more "blankets" containing fertile materials.

The formation of bubbles, or an increase in the percentage of vapor within the active portion of the reactor, which is in effect an increase in the percentage of voids in the active portion of the reactor, reduces the density of the liquid, and the resulting effect upon the reactivity of the reactor will depend upon the particular construction of the reactor. In general, one or more of the following effects will occur:

(1) The decrease in the liquid density will reduce the moderating effect of the liquid, and hence the neutron flux within the reactor will have a higher energy. As a result, the probability of a given neutron within the active portion of the reactor escaping from the active portion is increased, and hence leakage from the reactor is increased.

(2) Since the increased temperature from the higher power and the decreased density of the liquid moderator results in a higher average neutron energy within the reactor, there will be a higher neutron resonance absorption in any $U^{238}$ present in a thermal reactor.

(3) The decrease in the liquid density from the bubbles caused by the increase in reactor power decreases the probability of neutron absorption in the liquid itself.

(4) In reactors having fuel bodies, the increased temperature of the fissionable material bodies within the reactor as a result of the higher power level causes thermal expansion of fuel bodies. This factor tends to increase neutron leakage, and if $U^{238}$ is present, this factor also tends to increase the resonance absorption of neutrons by reducing self-shielding in the fuel bodies.

In order to regulate a reactor by bubble formation, it is not only necessary that the bubble formation have a sufficient effect on reactivity to overcome any reasonable reactivity increment injected into the reactor, but it is also necessary that the bubbles form in a sufficiently short period of time to overcome a neutron flux excursion before damage has been done to the reactor structure.

The inventor has found that bubbles form sufficiently rapidly in response to the insertion of a reactivity increment to compensate for this increase in reactivity before damage to the reactor structure can be caused, within limitations. The rate of rise of the neutron density within a reactor is a direct function of the magnitude of the excess reactivity. The inventor has found that a neutronic reactor operating at a temperature just below the boiling point of the reactor, and constructed according to the teachings of the present invention, will stabilize itself in the event a reactivity increment not to exceed 10% is added to the reactivity of the reactor before damage to the reactor structure occurs.

It is an object of the present invention to provide a neutronic reactor which will directly produce steam within the active portion of the reactor; and to provide methods of operating reactors which result in the formation of steam in the active portion of the reactor.

It is a further object of the present invention to provide a neutronic reactor with a steam forming coolant capable of stable operation with the coolant, in a boiling state. In particular, it is an object of the present invention to provide such a reactor in which an increase in the reactor reactivity will be nullified by an increase in the percentage of steam within the reactor active portion.

In addition, it is an object of the present invention to provide a reactor with a liquid moderator and a steam forming coolant which produces steam directly within the active portion of the reactor from the coolant, but avoids the formation of bubbles in the liquid moderator.

A further object of the present invention is to provide a reactor with a boiling steam forming coolant in which the coolant is circulated by convection, thus reducing the pumping power required to operate the reactor.

Further, it is an object of the present invention to provide a method of operating a reactor having a steam forming coolant in which steam is produced directly in the reactor core and changes in reactivity are compensated by changes in the power level of the reactor.

These and further objects of the present invention will be more fully understood from a further reading of the present specification, particularly when viewed in the light of the drawings, in which:

Figure 2 is a vertical sectional view of the reactor illustrated in Figure 1;

Figure 3 is a somewhat schematic plan view of the core of the reactor illustrated in Figure 2;

Figure 1:
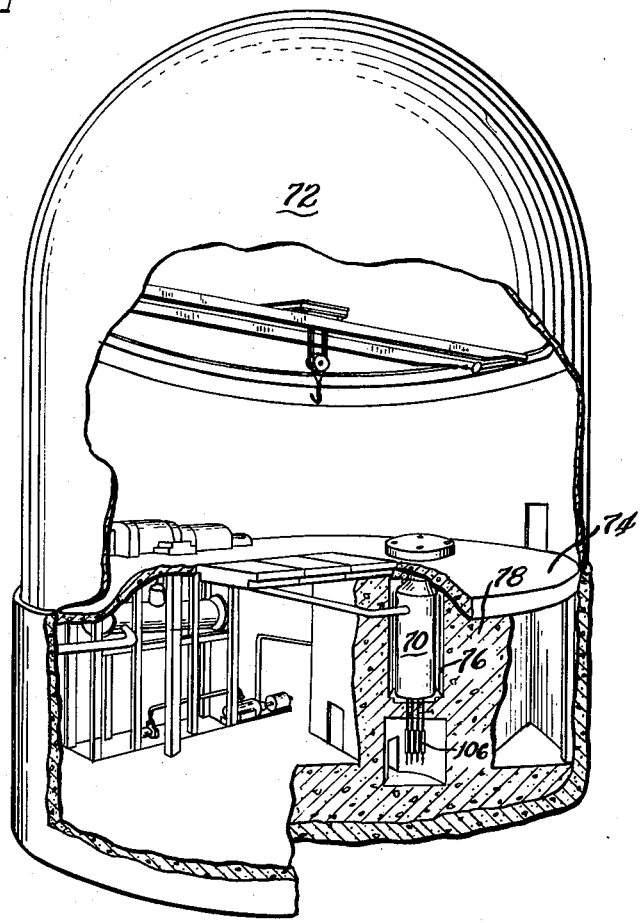
Figure 1 is an isometric view, partly cut away and in section, of a neutronic reactor constructed according to the teachings of the present invention.
Figure 9:
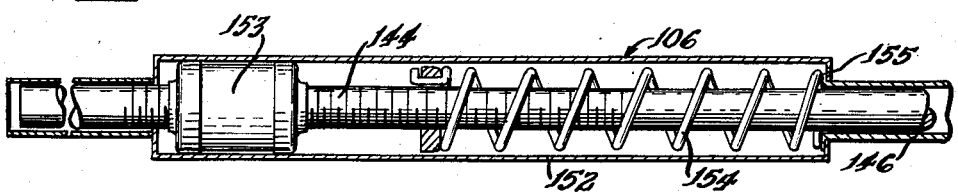
Figure 10:
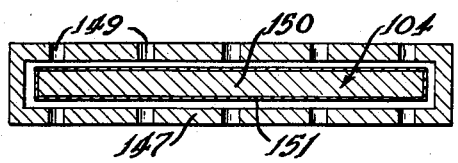
Figure 12:
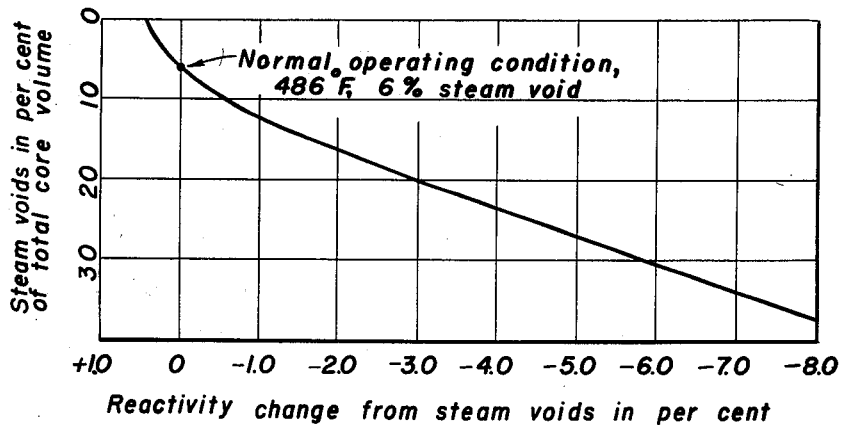
Figure 13:
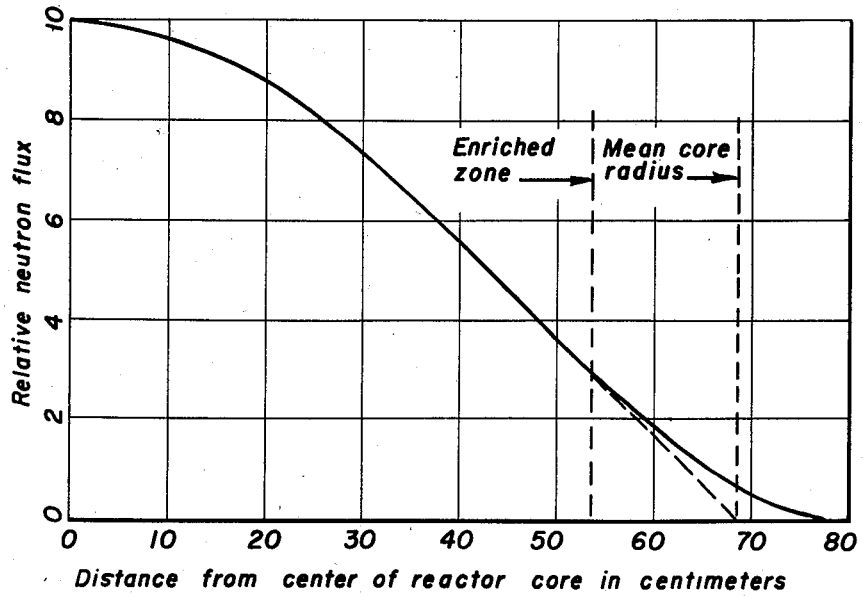
Figure 14:
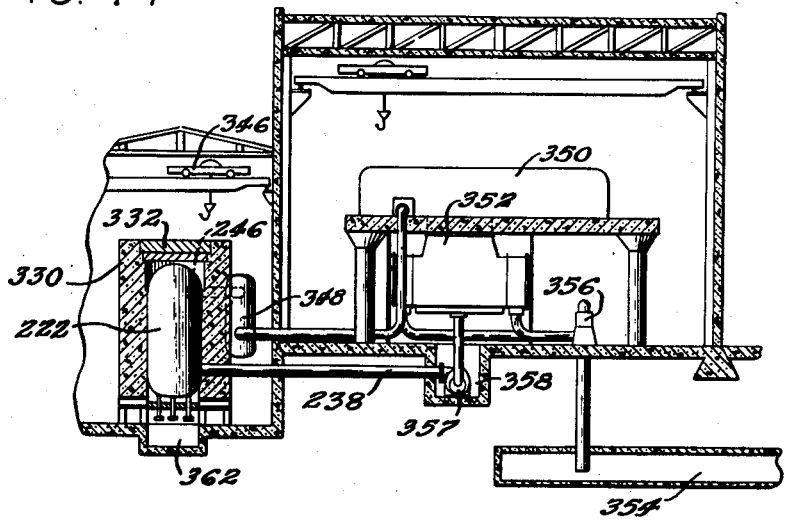
Figure 15:
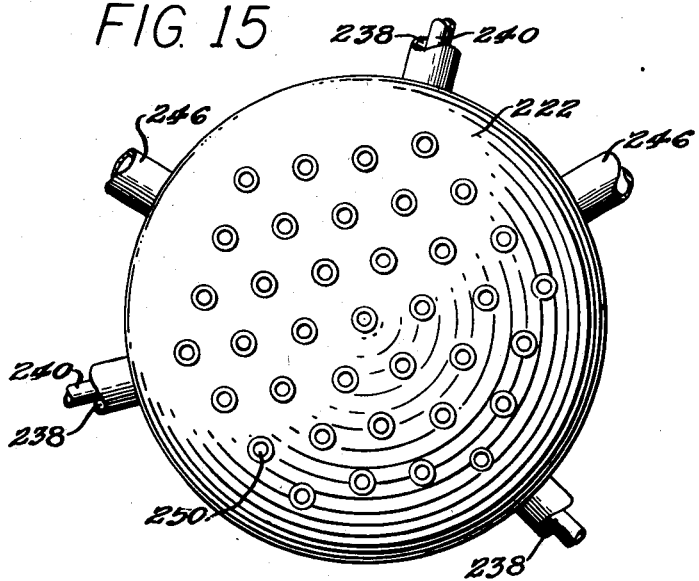
Figure 16:
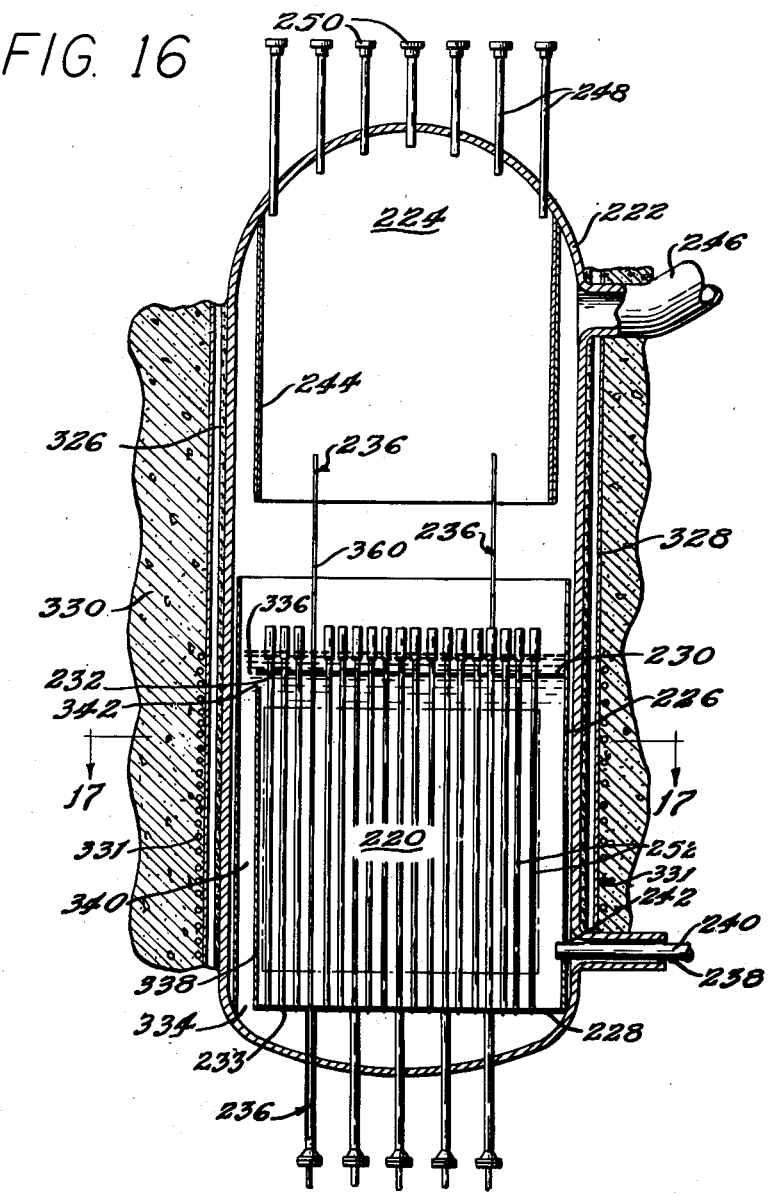
Figure 24:
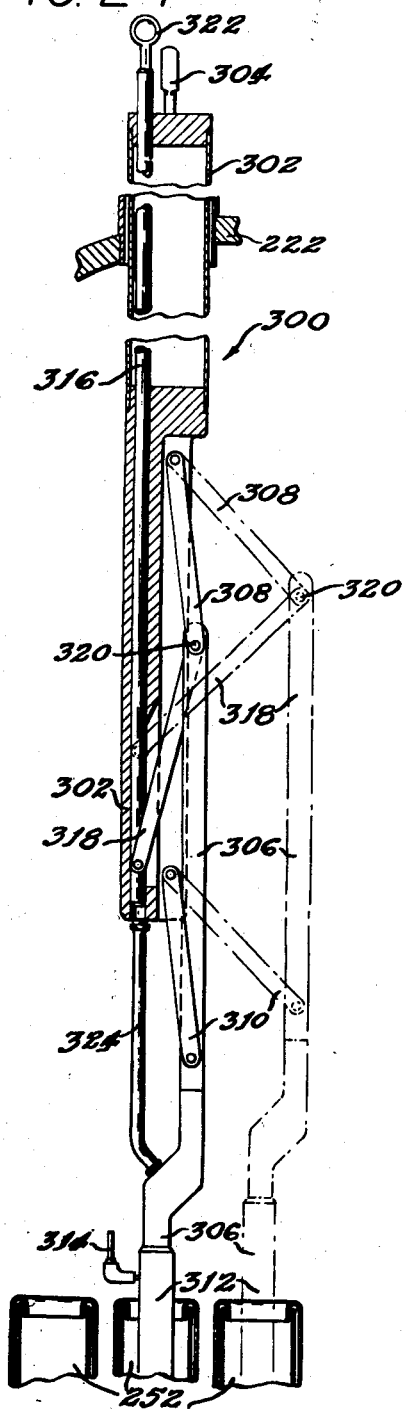
Figure 25:
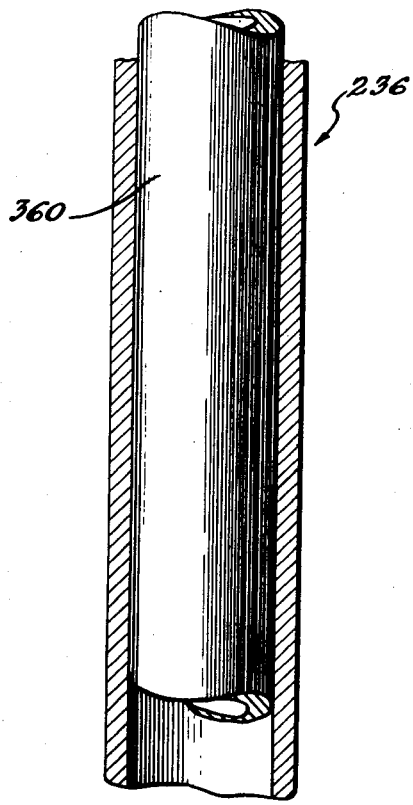

Figure 4 is a vertical sectional view taken along the line 4—4 of Figures 6 and 7a, of one of the fuel elements for the reactor illustrated in Figures 1 through 3;

Figure 5 is a vertical sectional view taken along the line 5—5 of Figure 7b, of a second type of fuel element used in the reactor illustrated in Figures 1 through 3;

Figure 6 is a sectional view taken along the line 6—6 of Figure 4;

Figure 7a is a sectional view taken along the line 7a—7a of Figure 4;

Figure 7b is a sectional view taken along the line 7b—7b of Figure 5;

Figure 8 is an elevational view from the line 8—8 of Figure 4;

Figure 9 is a sectional view of one of the control drive mechanisms illustrated in Figures 1 and 2;

Figure 10 is a sectional view of one of the control elements illustrated in Figures 2 and 3;

Figure 11 is a flow diagram showing the coolant circuit and the steam circuit for the reactor;

Figure 12 is a graph showing the relation of the ratio of the volume of steam in the reactor core to the total core volume relative to the reactivity of the reactor in percent of the neutron reproduction ratio, $K_{eff}$, at criticality;

Figure 13 is a graph illustrating the thermal neutron flux pattern as it appears horizontally through the center of the reactor core, the relative neutron flux being plotted along the ordinate in percent, and the distance from the center of the reactor core in centimeters being plotted along the abscissa;

Figure 14 is a sectional view illustrating an electricity generating plant utilizing a boiling reactor;

Figure 15 is a plan view of the reactor shown in Figure 14;

Figure 16 is a vertical sectional view of the reactor illustrated in Figure 15;

Figure 17 is a horizontal sectional view taken along line 17—17 of Figure 16;

Figure 18 is a vertical sectional view of the upper portion of a fuel element for the reactor illustrated generally in Figure 16;

Figure 19 is a vertical sectional view of the lower portion of the fuel element illustrated in Figure 18;

Figure 20 is a horizontal sectional view taken along the line 20—20 of Figure 18;

Figure 21 is a sectional view taken along the line 21—21 of Figure 18;

Figure 22 is a sectional view taken along the line 22—22 of Figure 19;

Figure 23 is a sectional view illustrating the cross-section of the fuel ribbons used in the fuel element illustrated in Figures 18 and 19;

Figure 24 is a vertical sectional view illustrating a device for loading and unloading the fuel elements in the reactor best illustrated in Figure 16;

Figure 25 is a fragmentary view illustrating the portion of the control elements containing neutron-absorbing materials;

Figure 26 is a vertical sectional view of a third reactor constructed according to the teachings of the present invention;

Figure 27 is a horizontal sectional view taken along the line 27—27 of Figure 26;

Figure 28 is a sectional view taken along the line 28—28 of Figure 26;

Figure 29 is a vertical sectional view taken along the line 29—29 of Figure 28;

Figure 30 is a fragmentary enlarged sectional view of a portion of the reactor core illustrated in Figure 26;

Figure 31 is an elevational view, partly in section, of one of the fuel elements used in the reactor illustrated in Figures 26, 27 and 30;

Figure 32 is a sectional view taken along the line 32—32 of Figure 31;

Figure 33 is a horizontal sectional view of the control rod of the reactor shown in Figure 26; and Figure 34 is a sectional view of a fragment of the fuel element illustrated in Figure 32.

A neutronic reactor which utilizes water ($H_2O$) for both moderator and coolant may be constructed of virtually any size and operated in a boiling condition if properly designed. However, in order to construct water cooled and moderated boiling reactors of small dimensions and large dimensions, it is necessary to use two different mechanisms to obtain inherent stability. In the case of small water cooled and moderated reactors, steam bubble formation results in an increase in neutron leakage from the reactor core which is sufficient to achieve inherent stability. However, in large water moderated and cooled reactors, this effect is not adequate to achieve inherent stability. In both large and small water cooled and moderated reactors, inherent stability can be achieved if a sufficient quantity of $U^{238}$ is present, since the formation of bubbles will increase the resonance absorption of neutrons in the $U^{238}$ and achieve a negative power-reactivity relationship by this mechanism. The inventor has found that if the core of the reactor has a minimum cross sectional dimension greater than three feet, a water-cooled and water moderated reactor will not have inherent stability by the leakage mechanism. The reactor therefore must include a quantity of $U^{238}$ in order to achieve inherent stability by the increased resonance absorption in the $U^{238}$, or employ some other device for achieving inherent stability.

The reactor illustrated in Figures 1 through 13 is a water cooled water moderated reactor which achieves inherent stability as a result of increased neutron leakage and increased neutron resonance absorption in $U^{238}$ with the formation of bubbles. The reactor 70 is disposed within a building 72 beneath the ground level 74 of the surrounding terrain. The reactor 70 is mounted within a cavity 76 in a concrete supporting structure 78, and a layer of thermal insulation 80 is disposed between the reactor 70 and the walls of the cavity 76.

The reactor 70 is provided with a pressure vessel 82 which is cylindrical in shape and disposed vertically within the cavity 76. The pressure vessel 82 is provided with a neck 84 at its upper end with a diameter smaller than that of the pressure vessel 82, and the neck 84 forms an aperture 86 permitting access into the pressure vessel 82. A removable cover 88 is removably secured to the neck 84 of pressure vessel 82 about the periphery of the aperture 86 by spaced bolts 90 extending through the cover 88 and anchored into the neck 84 of the pressure vessel 82. The pressure vessel 82 includes a tank 91 and a stainless steel liner 92 on its inner surface which prevents corrosion of the steel tank 91. The inner diameter of the stainless steel liner 92 is 6 feet 0 inch throughout the cylindrical portion of the pressure vessel 82, and the inner diameter of the neck portion 84 of the pressure vessel 82 is approximately 3 feet. The pressure vessel 82 rests upon a cylindrical tank support 93 which is secured to the base of the tank 91 and rests upon the concrete supporting structure 78. The base of the tank 91 is in the form of a spherical segment 94 which supports the reactor core, designated 95, within the pressure vessel 82.

The neck 84 of the pressure vessel 82 is approximately 4 feet long, and it takes approximately 1 foot to curve the pressure vessel 82 from its maximum diameter to the diameter of the neck 84. The height of the pressure vessel between the neck and the spherical segment base 94 is approximately 20 feet measured along the axis of the pressure vessel 82. The pressure vessel 82 is designed to withstand pressures up to 800 lbs. per square inch, and is intended to be operated at a pressure of 600 lbs. per square inch.

The cavity 76 which surrounds the pressure vessel 82 is also cylindrical in form with a diameter of approximately 8 feet. The layer of thermal insulation 80 which is attached to the exterior surface of the pressure vessel minimizes the escape of thermal energy from the interior of the pressure vessel. The thermal insulation 80 in the particular construction here described is asbestos and has a thickness of approximately 1 foot. Between the thermal insulation 80 and the surfaces of the cavity 76 is an air gap 96 which also thermally insulates the pressure vessel 82 from the supporting structure 78.

The supporting structure 78 is also provided with a second cavity 97 directly beneath the first cavity 76, the two cavities being separated by a platform 98 of concrete which is about 3 feet thick. The pressure vessel 82 rests upon the platform 98, and an aperture 99 extends through the platform 98 directly beneath the pressure vessel 82. The aperture 99 has two portions 100 and 101 disposed adjacent to each other, the upper portion 100 having a greater diameter than the lower portion 101 of the aperture. A plug 102 in the form of a stepped cylinder has cylindrical sides conforming to those of the aperture 99 and is disposed within the aperture 99. The plug 102 is provided with a plurality of channels 103 which extend therethrough parallel to the axis of the pressure vessel 82 in order to accommodate movable control elements 104 for the reactor.

A secondary steel tank 105 lines the entire cavity 76 and also the walls of the aperture 99. The tank 105 is sealed to a plurality of control rod drive mechanisms 106 which extend into the second cavity 97 through the channels 103 in the plug 102. In this manner, any liquid leakage which occurs from the pressure vessel 82 will be retained within the secondary tank 105. Also, the cavity 76 is surrounded by a plurality of coolant tubes 107 embedded in the concrete supporting structure 78 adjacent to the secondary tank 105, and a flow of liquid coolant, namely water, in the particular construction, removes the heat which penetrates to the concrete supporting structure 78 and prevents deterioration of the concrete therein.

The upper end of the cavity 76 (adjacent to the ground level 74) is provided with a cylindrical region 108 with a larger diameter than the rest of the cavity forming a shoulder 109. A cylindrical concrete shield block 110 rests upon the shoulder 109 and conforms in shape to the surface of the cavity 76. A plug 111 is disposed within the neck 84 of the pressure vessel 82 and attached to the cover 88 thereof. The plug 111 and shield block 110 are constructed of concrete, and are also provided with coolant tubes 112 through which cooling water flows. A removable annular shielding slab 113 rests upon the ground surface 74 and extends over the neck 84 and annular shield block 110. It too is constructed of concrete.

The reactor core 95 rests upon an annular core supporting structure 114 which is provided with pedestals 115 which are attached to the base 94 of the pressure vessel 82. The core 95 is formed by a plurality of removable fuel elements 116, each of the fuel elements 116 being slidably disposed within a channel 117 which extends through the support structure 114 parallel to the axis of the pressure vessel 82. These removable fuel elements 116 contain thermal neutron fissionable material for maintaining the neutron chain reaction and are of two types, 118 and 119. A neutron chain reaction cannot be initiated and sustained with uranium having the isotopic content found in nature disposed within a body of water ($H_2O$). It is for this reason that fuel elements 118 contain fissionable material consisting of uranium having the isotopic content found in nature, and fuel elements 119 contain fissionable material highly enriched in the $U^{235}$ isotope, as well as uranium with the isotopic content found in nature.

As illustrated in Figures 4 and 5, both of the fuel elements 118 and 119 have mounting stems 120 at one end which are removably positioned within channels 117 in the support structure 114. The stems 120 are provided with central channels 121 which communicate with the exterior of the stems 120 through three apertures 122 at one end of the stems 120. The apertures 122 are in the form of segments of a circle formed by fins 123 which also serve to properly orient the fuel elements 116 within the support structure 114.

In the case of the elements 118, a pair of side plates 124 are attached to opposite sides of the stems 120 and extend to a rectangular discharge fitting 126, as illustrated in Figure 7b. The side plates 124 are each provided with four indentations 127, and the indentations of confronting plates confront each other. Four plates 128 having thicknesses approximately equal to that of the indentations are disposed between the side plates 124 and anchored within confronting indentations 127.

The elements 118 have side plates 124 constructed of zirconium approximately ⅛ inch thick and spaced from each other by a distance of 3⅝ inches. The plates 128 are spaced from each other by a distance of approximately ⅝ inch, and the thickness of the plates 128 is approximately ⅜ inch. Each of the plates 128 is 48 inches long and 3¾ inches wide. The plates 128 have a body 129 and a cladding 130. The cladding 130 has a thickness of .020 inch and consists of zirconium. The body 129 consists of 93½% uranium having the isotopic content found in nature, 5% zirconium, and 1½% niobium.

The core supporting structure 114 is constructed of stainless steel, and the length of the channels 117 is approximately 20 inches. The stems 120 of the fuel elements 118 and 119 have annular portions 131 for the first 24 inches, and rectangular portions 132 adjacent to the side plates 124. The diameter of the annular portions 131 is slightly smaller than the diameter of the channels 117 in the core supporting structure 114, namely approximately 3½ inches. The discharge fitting 126 is hollow and rectangular in shape with approximately the same dimensions as the rectangular portion 132 of the stem 120. A plurality of orifices 133 are provided in each discharge fitting 126, the rectangular end being open and forming a discharge port 134. The discharge fitting 126 is constructed of stainless steel and has a length of approximately 4 inches.

The fuel elements 119 include the same stems 120 and discharge fittings 126, but the regions between these structures are different from that of the fuel elements 118, as illustrated in Figures 6 and 7a. Side plates 136 constructed of zirconium having a thickness of ⅛ inch are secured between the stem 120 and the discharge fitting 126 of each fuel element 119 in a manner similar to the side plates 124 of the elements 118, but three aligned groups of five parallel spaced slots 137a, 137b and 137c are disposed in the confronting surfaces of the side plates 136 and confront each other. Five plates 138 containing uranium having the isotopic content found in nature are disposed between the first group of confronting slots 137a, this group being disposed adjacent to the stem 120 of the elements 119. Immediately adjacent to the first group of aligned slots 137a, is the second group of slots 137b, and five plates 139 containing uranium highly enriched in the U$^{235}$ isotope. There are also five plates 138 containing uranium with the isotopic content found in nature disposed within the third group of confronting slots 137c in the side plates 136, this third group of slots 137c being disposed between the discharge fitting 126 of the fuel elements 119 and the second group of slots 137b. The plates 138 are each 8 inches in length, and the plates 139 containing uranium highly enriched in the U$^{235}$ isotope are each 32 inches in length, the plates 138 being separated from the plates 139 by a distance of approximately ⅛ inch.

The side plates 136 are constructed of zirconium and have a thickness of ⅛ inch, width of 3⅞ inches, and length of approximately 52 inches. The slots 137b in the second group are each approximately 1/16 inch in depth and have a width of approximately ⅛ inch. However, the slots 137a and 137c in the other two groups have a depth of approximately 1/16 inch and width of approximately ¼ inch. Each of the plates 138 has a body 140 consisting of 93½% natural uranium, 5% zirconium, and 1½% niobium, and a cladding 141 20 mils thick consisting of zirconium which is disposed about the body 140 and seals it from the water moderator. The plates 138 have a thickness of approximately ¼ inch, a length of 8 inches and a width of 3¾ inches. The plates 139 have a body 142 consisting of a uranium-zirconium alloy containing 5% uranium and 95% zirconium, the uranium being enriched in the U$^{235}$ isotope so that the U$^{235}$ isotope constitutes 93.5% of the uranium in the alloy, the body 142 being 80 mils thick, 3¾ inches wide, and 32 inches long in each of the plates 139. In addition, the plates 139 are provided with a cladding 143 of zirconium 10 mils thick. The plates 139 are spaced from each other by a distance of approximately ⅝ of an inch, and the plates 138 are spaced from each other by a distance of approximately 9/16 inch.

The channels 117 in the core supporting structure 114 are positioned to place the elements 116 in abutting relationship, so that the uranium containing plates 128, 138 and 139 are approximately equally spaced from each other and generally disposed on planes parallel to each other, as illustrated in Fig. 3. In the core 95 of the reactor 70, there are a total of 110 elements 118 and 38 elements 119 arranged to form an approximate foreshortened cylinder. The fuel elements 116 are disposed with their side plates 124 and 136 in parallel relationship in rows, the side plates 124 and 136 of adjacent rows abutting each other, and there being a total of 16 rows. As illustrated in Figure 3, the first row, designated 143a contains two fuel elements 118, the second row 143b contains five fuel elements 118, the third row 143c contains eight elements 118, the fourth row 143d seven elements 118 and two elements 119 disposed centrally in the row, the next row 143e nine elements 118 and three elements 119, the three elements 119 being separated by elements 118 and disposed between four elements 118 at one end and three elements 118 at the other end of the row. The next row 143f contains eight elements 118 and four elements 119, the four elements 119 being separated by elements 118 and positioned between three elements 118 at one end of the row 143f and two elements 118 at the other end of the row 143f. The next row 143g contains seven elements 118 and five elements 119, the five elements 119 being positioned between elements 118, and two elements 118 being disposed at one end of the row 143g and one at the other end of the row. The following row 143h contains nine elements 118 and five elements 119, the five elements 119 being positioned between elements 118, and two elements 118 being disposed at one end of the row 143h and three elements 118 being disposed at the other end of the row 143h. Thus far, the left half of the core 95 (as viewed in Figure 3) has been described, and the right half of the core 95 is constructed in similar manner, as illustrated in Figure 3. There are a total of thirty-eight elements 119 and 110 elements 118.

The reactor is also provided with twelve neutron absorbing control elements 104. The control elements 104 are disposed parallel with the axis of elongation of the pressure vessel 82 and are connected to the control rod drive mechanisms 106 by extension rods 144. The extension rods 144 extend through the channels 103 in the plug 102, the extension rods 144 being surrounded by sleeves 146 extending through the channels 103, the sleeves 146 being sealed to the secondary tank 105. The control elements 104 are slidably journaled within housings 147, best shown in Figure 10, which are secured within apertures 148 in the reactor core support structure 114. The housings 147 are rectangular in shape and provided with perforations 149. The housings 147 also extend above the core 95 a distance of approximately 3 feet. The housings 147 are constructed of zirconium and have walls approximately ¼ inch thick. The extension rods 144 are also constructed of zirconium and have a diameter of approximately ½ inch. The control elements 104 themselves are in the form of plates 150 of ¼ inch thickness provided with a stainless steel cladding 151. The control elements 104 measure approximately 3½ inches wide, ½ inch thick, and 4 feet long, the thickness of the stainless steel cladding 151 being 20 mils. The control elements 104 extend approximately 1 foot above the housings 147 when in the position of maximum reactivity, as illustrated in Figure 2.

One of the control rod drive mechanisms 106 is shown in detail in Fig. 9. The rod extension 144 extends through a housing 152 of the drive mechanism 106 and an electric motor 153 is mounted to the housing and has a rotor threadedly engaged with the extension rod 144. A spring 154 is also disposed within the housing 152 and has one end abutting the end 155 of the housing 152 and the other end attached to the extension rod 144. The extension rod 144 is not rotatable within the housing 152 or sleeve 146, so that operation of the motor 153 translates the extension shaft within the sleeve 146 and housing 152. In this manner, the spring 154 is compressed as the control element 104 is removed from the core 95 of the reactor. When the control element is to be reinserted into the core 95 of the reactor, the spring 154 supplies an additional acceleration, in the particular construction, an acceleration equal to 2g.

As shown in Fig. 3, again viewing the figure from the left, the first row 143a of fuel elements 116 contains no control elements 104, nor does the second row 143b, or third row 143c. The fourth row 143d, however, contains two control elements 104, these elements being spaced from the ends of the row 143d by three fuel elements 116. The next adjacent row 143e contains no control elements 104, nor does the next adjacent row 143f. However, the following row 143g contains four control elements 104, the outer two being disposed with three fuel elements 116 between them and the ends of the row 143g, and each of the other two control elements 104 being spaced by fuel element 118 and fuel element 119. The next row 143h again contains no control elements. This covers the left half of the core 95, and the right half is of similar construction, as illustrated in Figure 3.

Figure 11 schematically illustrates the cooling water and steam systems for the reactor. The water level, designated 156, within the pressure vessel 82 is disposed about halfway between the spherical base segment 94 of the pressure vessel 82 and the neck 84 thereof. In this manner, a steam dome 157 is formed between the water level 156 and the neck 84 of the pressure vessel 82. The steam dome 157 functions to collect steam, form a cushion against pressure surges, and to delay the passage of steam from the reactor core for a period of time, thus permitting a portion of the water carried by the steam to return to the body of water within the pressure vessel 82.

The pressure vessel 82 is provided with an aperture 158 slightly below the neck 84 thereof, and a steam separator and accumulator 159 is connected to the pressure vessel through this aperture 158. The steam separator and accumulator 159 further reduce the moisture content of the steam produced within the reactor and return the excess water through a pipe 160 to the body of water within the reactor pressure vessel 82. The steam is conducted from the steam separator and accumulator 159 through a flow meter 161 and a turbine throttle valve 162 to a steam turbine 163. The turbine 163 is mechanically connected to a generator 164, and the steam exhausted from the turbine 163 is conducted to a condenser 166. The water condensate in the condenser 166 is then pumped back into the pressure vessel 82 through a pair of parallelly connected pumps 167 and 168 which are provided with inlet valves 169 and outlet valves 170. The water condensate reenters the pressure vessel 82 through an aperture 171 high up in the steam dome, and is conducted through a pipe 172 downwardly to a perforated distribution ring 173 which is disposed beneath the surface of the water 156 within the pressure vessel 82, and slightly above the tops of the fuel elements 116 in the core 95, as illustrated in Figure 2. The distribution ring 173 is disposed on a plane normal to the axis of elongation of the pressure vessel 82 and adjacent to the inner surface of the pressure vessel 82.

The condenser 166 is cooled by a flow of water in a closed circulation loop. The water coolant is conducted through a pump 174 to a cooling tower 176 which reduces the temperature of the water to a suitable value, and thence the water is returned to the condenser 166.

The excess steam from the condenser 166 is pumped by a pump 177 to one of two holdup tanks 178 and 179. The holdup tanks 178 and 179 are connected to the pump 177 through inlet valves 180. The holdup tanks 178 and 179 are also provided with outlet valves 181 which connect the holdup tanks 178 and 179 to an air filter 182 and thence to a stack 183.

The steam dome 157 is provided with two pressure relief valves 184 and 186. The first pressure relief valve 184 exhausts directly to the atmosphere and is connected into the steam dome 157. It is adjusted to trigger at a pressure of 800 pounds per square inch. The second pressure relief valve 186 is also connected into the steam dome 157 but exhausts into the condenser 166. This pressure relief valve 186 is adjusted to trigger at a pressure of 700 pounds per square inch. In this manner, steam released by the pressure relief valve 186 will traverse the condenser 166, and hence one of the holdup tanks 178 or 179. In this manner, any radioactivity present in the steam will be permitted to partially decay in the holdup tank before being exhausted to the atmosphere.

A bypass control valve 187 is also connected between the inlet end of the turbine throttle valve 162 and the condenser 166. The dashed line in Figure 11 indicates that the turbine throttle valve 162 and bypass control valve 187 are interconnected, however, the bypass control valve 187 may be actuated independently from the turbine throttle valve 162. When independently operated, the bypass control valve 187 permits a portion, or all, of the steam generated by the reactor to be directly connected to the condenser 166, thus bypassing the turbine 163. In this manner, it is possible to operate the reactor without the turbine. However, in usual operation the bypass control valve 187 is linked to the turbine throttle valve 162. The turbine throttle valve 162 is itself linked with an overspeed governor 188 which is mechanically connected to the turbine 163, and when the overspeed governor 188 responds to an overspeed of the turbine 166, the turbine throttle valve 162 is actuated to reduce the flow of steam into the turbine 163. This action generally occurs when the load upon the turbine 163 is greated reduced. Since a reduction in the flow of steam from the reactor would build up pressure within the pressure vessel 82 of the reactor, thus reducing the voids formed by the steam bubbles in the reactor core 95, this condition is to be avoided. By linking the bypass control valve 187 to the turbine throttle valve 162, the closing of the turbine throttle valve 162 opens the bypass control valve 187, thus preventing a reduction in the flow of steam from the steam dome 157 of the reactor.

The turbine 163 and generator 164 are rated at approximately 5000 kilowatts electrical output, and an inlet steam pressure of 550 to 575 pounds per square inch, and an exhaust steam pressure of 2½ inches of mercury. An extraction type turbine is desirable in order to maintain the moisture content in the last exhaust stage within acceptable limits (12 to 14%). This is accomplished by a steam separator 189 which is connected between the stages of the turbine 162, the water removed from the steam being returned to the condenser 166.

The control of steam flow to the turbine 163 during start up is accomplished in the conventional manner, i.e., with the turbine throttle valve 162. Also, load regulation of the generator 164 is automatically accomplished by the overspeed governor 188 actuating the throttle valve 162 and bypass control valve 187, as described above.

In order to remove corrosion products from the water in the reactor, two separate filtering systems are incorporated into the reactor heat exchange system. Corrosion products will decrease the heat transfer from the fuel elements, and are therefore undesirable. One ion exchanger 190 is connected between the outlet valves 170 of the feed pumps 167 and 168 and the inlet valves 169 of the feed pumps 167 and 168 through an inlet valve 191, an inlet filter 192, an outlet filter 193 and an outlet valve 194. This purification system bleeds off a portion of the condensate from the condenser 166 and purifies it before it is returned to the reactor pressure vessel 82. The second purification system employs an ion exchanger 196 connected to the pressure vessel 82 through a valve 197, a heat exchanger 198, and a filter 199. The ion exchanger 196 is also connected to the outlet end of the condenser 166 through a filter 200 and a valve 201. The heat exchanger 198 is provided with a flow of coolant water to reduce the temperature of the water passing through the ion exchanger 196 to a suitable value for efficient ion exchanger operation.

A make-up tank 202 is also connected to the condenser 166 through a valve 203. The make-up tank 202 is used to store filtered and purified water for the reactor and to introduce additional quantities of water into the cooling system. An external water level indicator 204 is connected to the pressure vessel 82 at a point below the water lever 156 and at a point above the water level 156 in order to determine the level of the water within the reactor pressure vessel 82.

It is desirable from a control viewpoint that the temperature of the water within the pressure vessel 82 be 212° F. or higher before any of the control rods 104 are removed from the core 95 of the reactor. It is therefore desirable that the water within the reactor pressure vessel 82 be brought to a temperature of 212° F. by non-nuclear means. For this reason, an external heater 206 is disposed adjacent to the pressure vessel 82 and connected to the pressure vessel 82 at two points below the water level 154. In the particular construction, the external heater 206 employs a source 207 of electric power to heat the water within the pressure vessel before start up, although it will be understood that other types of power could also be employed.

Table I summarizes some of the principal design characteristics of the reactor disclosed above:

TABLE I

| | |
|---|---|
| Pressure vessel | 6 ft. diameter, 19 ft. high. |
| Pressure in pressure vessel | 600 lbs. per sq. in. |
| Moderator | $H_2O$. |
| Volume ratio of $H_2O/U$ | 2.5:1. |
| Core diameter | 4½ ft. |
| Core height | 4 ft. |
| Maximum fuel element surface temperature. | 515 F. |
| Maximum fuel element core temperature. | 610 F. |
| Reactor power | 20,000 kw. |
| Generating capacity | 5,000 kw. |
| Efficiency | 25 percent. |
| Core volume | 1,800 liters total. |
| Power density-average | 11 kw./l. of core, 18 kw./liter of coolant. |
| Power density-maximum | 24 kw./l. of core, 39.5 kw./liter of coolant. |
| Saturated steam flow | 16.8 lb./sec. |
| Feed water flow | 120 gallons per minute. |
| Condensate return temperature | 110° F. |
| Average steam voids in exiting coolant. | 20 percent. |
| Fraction of height in boiling | 65 percent. |
| Mean steam voids for core | 6.5 percent. |
| Maximum heat flux | 150,000 B.t.u./(hr.)(sq. ft.). |
| Internal circulation ratio, i.e., the ratio of water mass flow to steam mass flow in the reactor. | 140:1. |

TABLE I—Continued

| | |
|---|---|
| Fuel elements 118 93.5% natural uranium+5% Zr+1½% Nb. | Approximately ⅜ in. plates, 20 mil zirconium clad, 4 ft. high, ⅝ in. water passage. |
| Fuel elements 119 | Natural uranium ends 8 in. long. |
| 30 assemblies in central zone of reactor. | Enriched zone 32 in. long; Zr—$U^{235}$ alloy plates; zirconium clad, 10 mils; body, 80 mils; 5% $U^{235}$, 95% Zr; water passage, ⅝ in. |
| Critical mass, operating plus 2 months' burnup of enriched fuel. | 10 kgs. $U^{235}$ and 6 tons natural uranium. |
| Operating cycle: | |
| Enriched fuel | 40% burnup, 2 years. |
| Natural fuel | 10,000 MWD/ton in 10 yrs. |
| Power distribution: | |
| Enriched uranium power | 25%. |
| Natural uranium power | 75%. |
| Safety and control | 12 boron-steel control rods in core; burnup, by adding $U^{235}$ fuel; transient, by insertion of poison control rod. |
| $\Delta k$ in steam voids (operating) | 0.5%. |
| $\Delta k$ in temperature | 2.1%. |
| $\Delta k$ in 20% steam voids | 4.9% hot, or 0.7% cold. |
| $\Delta k$ in 50% steam voids | 8.5% hot, or 6.3% cold. |
| Expansion of uranium as a result of a power excursion which expels water and increases resonance absorption prior to fuel melting. | 0.17% $k$. |
| Effect of withdrawing one control rod. | 1% $k$. |
| Effect of adding one enriched fuel rod. | 0.4% $k$ average or 1.0% maximum. |
| Prompt neutron lifetime | $5 \times 10^{-5}$ sec. |
| Radial flux, i.e., the ratio of the maximum thermal neutron flux to the average thermal neutron flux in a horizontal plane. | 2.2. |
| Axial flux, i.e., the ratio of the maximum thermal neutron flux to the average thermal neutron flux along the central axis of the reactor. | 1.43. |
| Neutron flux (average) | $10^{13}$ n./cm.²/sec. |

The fuel elements 116 must be removed from the reactor from time to time. The reactor is designed to require replacement of the fuel elements 118, which contain uranium with the natural isotopic content, after 10,000 megawatt days per ton of uranium, or in other words, approximately every ten years. The fuel elements 119, which contain enriched uranium sections, will require replacement on an average of every two years. Also, some enriched uranium elements 119 will be required to replace fuel elements 118 after prolonged periods of operation in order to maintain the desired reactivity as a result of losses in reactivity which occur through long term operation.

Fuel elements 118 and 119 are removed through the neck 84 of the pressure vessel 82. Before the fuel elements 116 are to be removed, the reactor is shut down, and the entire pressure vessel 82 flooded with water, including the steam dome 157. The water in the steam dome 157 is thus used as a shield when the removable slab 113, cover 88, and plug 111 are removed. The fuel elements 116 are then individually lifted through the neck 84 of the pressure vessel 82 and placed within a shielded container, or coffin, as is conventional, for removal. A time lapse of approximately 3 hours is required between reactor shutdown and unloading operations with the particular construction to permit the radioactivity of the fuel elements 116 to decay sufficiently for removal from the pressure vessel 82. New fuel elements 118 and 119 are lowered into the reactor through the neck 84 and placed in the supporting structure 114.

The heat generated within the fuel elements 118 and 119 is removed by the natural circulation caused by the boiling of the coolant within the fuel elements 118 and 119. The coolant water enters the reactor at a point above the reactor core 95 through the distribution ring 173. This water then flows downwardly, principally along the walls of the pressure vessel 82, to enter the fuel elements 116 at their lower extremity. The loss in density of the water in the fuel elements 116 as the water is heated and transformed to steam, causes the water to flow upwardly through the fuel elements 116. At full power, for each pound of steam formed approximately 140 pounds of water are circulated as a result of convection in this manner.

The water entering the fuel elements 116 is always slightly subcooled because the feed water is relatively cool. At the 20,000 kilowatt heat design condition, subcooling is approximately 3° F. Actual boiling does not occur until the cooling water has traversed approximately 35% of the height of the fuel elements 116. Steam formation, and thus a reduction in moderator density, occurs all along the remaining length of the fuel elements 116. Approximately 20% of the volume is steam as the steam-water combination exits from the fuel elements 116, and the average steam void content of the entire reactor core 95 is approximately 6.5%. At the full power of 20,000 kilowatts heat, the maximum power density within the hottest fuel element 116 is 39.5 kilowatts per liter of cooling channel volume.

The above-mentioned maximum power density corresponds to a thermal heat flux of 150,000 B.t.u./hr.-ft.$^2$. This heat rate produces a fuel plate surface temperature of about 515° F., and a maximum temperature within a fuel plate of 610° F.

Figure 12 illustrates the effect upon reactivity of voids in the water within the reactor core 95, the percentage of void being given relative to the volume of the reactor core 95. The operating point is indicated on the curve to illustrate that a change in voids will inversely affect the reactivity of the reactor. It is to be noted that his curve holds true and is repeatable only for a reactor at a boiling temperature prior to initiation of the chain reaction. If the reactor is brought to boil from a cold condition, a given percentage of voids will have a smaller effect on reactivity than that percentage of void will have after the reactor obtains thermal equilibruim.

The changes in the reactivity associated with reactor operation are summarized as follows:

TABLE II

| | Reactivity change in percent $k$ |
|---|---|
| Temperature effects, cold to hot | 2.1 |
| Xenon and samarium, at equilibrium percentages | 2.8 |
| 6% operating void | 0.5 |
| Burnup allowance | 0.4 |
| Total | 5.8 |

All of the reactivity changes listed above are negative reactivity changes with an increase in the items mentioned.

As the reactor power is increased, the percentage of voids average throughout the reactor core is also increased. The following table assumes the operating point to be 6.5% average voids which occur at a power level of 20,000 kilowatts of heat, which is the design point in the particular construction. The overload ratio appearing in the table is the ratio of the power under different conditions to that of the operating design point.

TABLE III

| Overload ratio: | Means voids in percent |
|---|---|
| 1.0 | 6.5 |
| 2.0 | 12.7 |
| 3.0 | 17.0 |
| 4.0 | 20.5 |

The reactor disclosed above is brought into operation by withdrawal of the control rods from the reactor core (the control rods are raised above the core), just as in the operation of other types of reactors, such as that disclosed in the Patent No. 2,708,656 of Fermi and Szilard, entitled "Nuclear Reactors," issued May 17, 1955. The water within the pressure vessel, however, is preferably first brought to a boiling condition before the control rods are withdrawn from the reactor, since the changes in reactivity due to temperature changes in bringing the reactor to the boiling condition need not then be experienced after start up and a larger amount of reactivity will be dissipated in bubbles. However, once the control rods are withdrawn, it is not necessary to continuously regulate the control rods to prevent a reactor runaway, as is true in the non-boiling operation of reactors. Further, the power level to which the reactor will rise upon start up is merely selected by withdrawing the control rod from the core of the reactor a suitable distance, since under a given set of conditions the amount of excess reactivity introduced into the reactor will determine its ultimate power level. The neutronic chain reaction increases in response to the insertion of excess reactivity into the reactor, and as a result the temperature of the coolant within the fuel elements 116 increases, forming an increase in the quantity of steam exiting from the fuel elements. The formation of steam reduces the density of the water within the reactor and increases the resonance absorption of neutrons in the $U^{238}$ present in the natural uranium, and to a lesser extent increases leakage from the reactor, and as a result lowers the reactivity until the entire reactivity increment which was inserted into the reactor by the partial withdrawal of the control elements has been nullified. The reactor will then operate at a power level fluctuating about the level thus achieved, this power level fluctuation being due to short term reactivity changes within the reactor.

The inventor has found that up to 10% $K_{eff}$ can be dissipated in bubble formation and still maintain control of the reactor. However, with large amounts of reactivity dissipated in bubbles, the power level of the reactor tends to fluctuate over wide ranges. The inventor has found that the best operating range is with 0.5 to 4% $K_{eff}$ dissipated in steam bubbles, since under these conditions substantial amounts of power are delivered from the reactor at a relatively constant level.

In the present construction, the neutronic reactor achieves criticality before use and the build up of fission fragments with the 8 peripheral control elements 104 entirely removed from the reactor and the 4 control elements 104 disposed about the axis approximately halfway removed from the core 95 of the reactor, these four control elements 104 being clustered about the vertical central axis of the core 95.

As previously stated, the invention may be practiced with a heavy water ($D_2O$) reactor which utilizes natural uranium for fuel, inherent safety being achieved principally by absorption of neutrons of resonant energy in the $U^{238}$ content of the uranium fuel. A heavy water moderated reactor may readily be constructed in relatively large sizes, and therefore inherent safety may not be achieved in all heavy water reactors as a result of increased leakage from the reactor with the formation of steam bubbles. The reactor illustrated in Figures 14 through 25 is a heavy water moderated reactor using uranium with the isotopic content found in nature for fuel.

As illustrated in Figures 16 and 17, the reactor core 220 is disposed within a pressure vessel 222 which is elongated and cylindrical in cross section. The core 220 is disposed in the lower end of the pressure vessel 222, and a steam dome 224 is disposed at the upper end of the pressure vessel 222. The volume of the steam dome 224 approximately equals the volume in which the reactor core is disposed. A cylindrical thermal shield 226 is disposed about the core 220 of the reactor adjacent to the walls of the pressure vessel 222. The thermal shield 226 is constructed of stainless steel and is adapted to prevent the passage of thermal neutrons to the exterior of the pressure vessel 222.

A pair of grids 228 and 230 disposed at the bottom and top of the core 220, respectively, are secured to the thermal shield 226 normal to the axis of the pressure vessel 222. The grids 228 and 230 are provided with a plurality of apertures 232 and 233, respectively, disposed in a hexagonal array, an aperture 232 in grid 228 being aligned with an aperture 233 in the grid 230, so that fuel elements, designated 252, for the active portion of the reactor may be supported within each pair of apertures 232 and 233. The grids 228 and 230 are also provided with apertures 234 which are aligned parallel to the fuel elements to permit translatable control elements 236 to be positioned within the active portion 220 of the reactor, as will be described hereinafter.

The pressure vessel 222 is provided with three equally spaced apertures 238 adjacent to the lower portion of the active portion 220 of the reactor, and a pipe 240 extends through each aperture 238 and is sealed therein. Each pipe 240 is also sealed within an aperture 242 in the thermal shield 226, and a flow of coolant heavy water tranverses the pipes 240 into the pressure vessel 222.

A cylindrical baffle 244 is axially disposed within the pressure vessel 222 and sealed to the dome 224 thereof. A pair of steam outlet apertures 246 are disposed in the pressure vessel 222 adjacent to the dome 224 thereof and confront the cylindrical baffle 244. In this manner, steam rising from the active portion 220 of the reactor into the dome 224 of the pressure vessel 222 must exit by passing around the lower end of the cylindrical baffle 244, and a considerable amount of the water remaining in the steam will separate out upon the baffle 244 and return to the active portion of the reactor. A plurality of unloading tubes 248 pierce the dome of the pressure vessel 222, and leak-tight caps 250 seal the extremities of the unloading tubes 248. The lower portion of the pressure vessel 222 is filled with heavy water, the heavy water extending above the active portion 220 of the reactor, as illustrated in Figure 16.

The fuel elements 252 disposed within the active portion 220 of the reactor are illustrated in Figures 18 through 23. Each of these fuel elements 252 is provided with a cylindrical sleeve 254 which extends between a lower grid fitting 256 and an upper grid fitting 258. The upper portion of the aperture 233 in the lower grid 228 is outwardly flaring, and the lower grid fitting 256 is provided with a contour complementary thereto, so that the lower grid fitting 256 forms a relatively tight seal when disposed within the aperture 233. The lower grid fitting 256 extends beneath the lower grid 228 and is provided with a plurality of orifices 260 which permit the $D_2O$ in the pressure vessel 222 to enter into the lower grid fitting 256 and the sleeve 254 of the fuel element 252.

A fuel region 262 in each fuel element 252 is disposed adjacent to the lower grid fitting 256 and is supported thereon by a shaft 264 which extends along the axis of the sleeve 254 and is secured at its upper extremity to a support bar 270 which extends transversely across the sleeve 254 and to the lower extremity 266 of the grid fitting 256 at its other end. The thermal neutron fissionable material is disposed in the form of ribbons 268 which are twisted throughout their length and are supported upon the support bar 270 which is attached to the shaft 264. The support bar 270 is provided with slots 272, and strips 273 are secured in the slots 272 by a pin 275 in each fuel element 252. The twisted ribbons 268 are arranged in rows with one end of each ribbon in a given row being secured to a single strip 273. The flow of coolant water travels upwardly through the sleeve 254 of the fuel element 252 between the strips 273 in each fuel element 252. The upper ends of the ribbons 268 are self-supporting.

The upper grid fittings 258 are snugly fitted within the apertures 232 in the upper grid 230. Each grid fitting 258 is provided with a spiral deflector 276 which is attached to the sleeve 254 to make the flow of water and steam from the upper end of the fuel element 252 more uniform. The deflector 276 also is provided with a lifting knob 279 confronting the upper end of the fuel element 252. A steam separator 277 is attached to each of the upper grid fittings 258 and extends above the level of the moderator in the pressure vessel 222. As illustrated in Figure 18, each of the steam separators 277 has an outer sleeve 280 concentrically disposed and spaced from an inner sleeve 282 which is attached to the upper grid fitting 258 and extends above the moderator level. A ring 284 attached to the upper grid fitting 258 adjacent to the lower end of outer sleeve 280 of the steam separator supports the outer sleeve 280 and is provided with apertures 286 to permit water between the sleeves 280 and 282 to return to the pressure vessel 222. A second perforated ring 288 is disposed within the inner sleeve 282 adjacent to its mouth. The outer sleeve 280 has a lip 283 which extends about the mouth of the inner sleeve 282 and is secured to the perforated ring 288.

The steam exiting from the fuel element 252 tends to pass through the steam separator 277 along the axis of the fuel element 252, while water tends to be swirled to the inner wall 282 of the separator 277. As a result, water will pass through the perforations in the perforated ring 288 and downwardly between the inner sleeve 282 and the outer sleeve 280, through the apertures 286 in the perforated ring 284 and back into the pressure vessel 222.

The fissionable material for the reactor is fabricated in a form of the ribbons 268, as clearly illustrated in Figures 18, 19, 22 and 23. Each of the ribbons 268 is approximately oval in shape, as illustrated in Figure 23, and is provided with a fluid-tight jacket 290 about the surfaces thereof. Each ribbon 268 has a major axis of approximately 0.570 inch and a minor axis of approximately 0.175 inch. The jacket 290 has a thickness measured along the major axis of the ribbon 268 of 0.030 inch, and a thickness of approximately 0.015 inch measured along the minor axis. There are nine rows of ribbons 268 within each fuel section 262, the ribbons 268 being arranged in rows of 3, 6, 7, 8, 7, 8, 7, 6 and 3 ribbons in each row. The rows of ribbon 268 are equally spaced and centered within the sleeve 254 of the fuel elements 252. The tube 254 is constructed of zirconium while the lower grid fitting 256 and the upper grid fitting 258 are constructed of stainless steel. Each of the 55 twisted ribbons 268 contains cores consising of 93.5% uranium with the isotopic content found in nature, 1.5% niobium and 5% zirconium by weight, and the jackets 290 are constructed of zirconium. The elements may be fabricated by extrusion of a zirconium-clad uranium cylinder followed by row flattening and twisting.

The following table sets forth the design dimensions of the reactor.

TABLE IV

*Summary of reactor dimensions*

```
Reactor geometry:
  Pressure vessel diameter----------------------------- 16 ft.
  Pressure vessel height------------------------------- 43 ft.
  Active portion diameter (measured across center of   13½ ft.
    active portion from outer surfaces of outermost fuel
    elements).
  Active portion height (measured from ends of fuel    12 ft.
    ribbons 268).
  Radial D2O reflector-------------------------------- 1¼ ft.
  Vertical D2O reflector above and below active portion 1½ ft.
  Number of fuel elements 252------------------------- 205.
  Total cooling surface ------------------------------ 21,000 sq. ft.
  Lattice arrangement—6 in. diameter fuel tubes 252
    placed in 9 in. between centers parallel triangular
    lattice.
  Fuel element sleeves 254, outside diameter---------- 6 in.
  Wall thickness-------------------------------------- 1/16 in.
  Material ------------------------------------------- Zirconium
  Fuel alloy 268 thickness---------------------------- 0.120 in.
  Jacket 290 thickness-------------------------------- 0.015 in.
  Fuel element total thickness------------------------ 0.150 in.
  Composition of fuel alloy, percent by weight—
    U------------------------------------------------- 93.5.
    Nb------------------------------------------------ 1.5.
    Zr------------------------------------------------ 5.
  D2O/U weight ratio in reactor, cold operating------- 2.5/2.0.
Fuel and D2O requirements:
  Fuel, amount of uranium----------------------------- 39 tons.
  Total fuel alloy------------------------------------ 41.7 tons.
  Uranium per fuel assembly--------------------------- 265 lbs.
  Each fuel element 254 contains 55 fuel ribbons, 0.58 in.
    x 0.15 in. including 0.015 in. Zr clad.
  D2O in reactor tank (cold)-------------------------- 100 tons.
  D2O outside reactor--------------------------------- 20 tons.
```

Both the grids 228 and 230 are provided with a plurality of aligned recesses 334 and 336, respectively, and sleeves 338 are sealed to the grids 228 and 230 adjacent to the recesses 334 and 336 to form channels 340. Each of the sleeves 338 is provided with an aperture 342 adjacent to the top grid 230 to facilitate circulation of water, as will be hereinafter described.

As illustrated and described in Table IV, the reactor core 220 consists of 295 fuel elements heterogeneously arranged in the $D_2O$ moderator and coolant. The fuel elements are arranged in a 9 inch triangular lattice. The reactor operates with a steam pressure of 600 pounds per square inch with a steam saturation temperature of 486° F.

The heavy water moderator is maintained at an average temperature of 145° F. by introducing 90° F. heavy water into the pressure vessel 222 adjacent to the bottom thereof. By maintaining the moderator water at a relatively low temperature, increased moderation is obtained, and less reactivity change must be accommodated in going from hot to cold operation. Gamma ray and neutron heating in the moderator combines with heat transfer from the fuel tubes to increase the heavy water temperature to 190 F. at the top of the core. The heavy water is then introduced into the channels 340 which carry it downward to the inlet end of the fuel elements 252 as a result of the pressure differential caused by the rising of the heavy water in the fuel elements 252, so that circulating water is subcooled as it enters the fuel elements 252 with a temperature of approximately 450° F. As the heavy water flows upward through the fuel elements 252 boiling starts after about 25% of the travel. It continues to boil through the remainder of the fuel elements 252 and leaves the core approximately 1/7 by weight steam and 6/7 water. This mixture passes through the primary moisture separators at sufficient speed to swirl the water to the inner sleeve 282 and concentrate the steam at the center of the sleeve 282. The water flows into the space 281 between the sleeves 280 and 282 after rounding the lip 283 of the outer sleeve 280 and exits into the pressure vessel through the apertures 286 adjacent to the lower end of the outer sleeve 280. The steam proceeds through the top end of the fuel element 252 and passes into the steam dome 224. The steam then passes around the baffle 244 to the inside surface of the pressure vessel 222 and exits through the apertures 246.

As stated previously, the fuel elements 252 are disposed within the active portion 220 parallel to each other and spaced 9 inches apart in a triangular lattice. All told, there are 295 fuel elements 252 in the active portion 220 of the reactor, and these fuel elements 252 must be removed through the dome 224 of the pressure vessel 222. The pressure vessel 222 would be materially weakened if 295 orifices were provided in the dome 224, so one unloading tube 248 pierces the dome 224 of the pressure vessel 222 for each seven fuel elements 252. As a result of reducing the spacing between the unloading tubes 248, the pressure vessel 222 will carry an internal pressure approximately 2¼ times greater with the same degree of safety.

A suitable mechanism for unloading the fuel elements 252 from the active portion 220 is illustrated in Figure 24 and designated 300. It has a cylindrical frame 302 which is inserted through a fuel unloading tube 248 into the pressure vessel 222. A lifting ring 304 is attached to the cylindrical frame centrally at its upper extremity and may be attached to a crane, such as crane 346 illustrated in Figure 14, for lifting the unloading device 300 from the reactor and inserting it therein. The unloading device 300 has an arm 306 which is attached to the frame 302 by a pair of parallel arms 308 and 310 which are pivotally attached to the frame 302 and to the arm 306. The arm 306 is maintained parallel to the axis of the frame 302 by the pivot arms 308 and 310, and the arm 306 is provided with a gripper device 312 at its lower extremity which is adapted to grip a fuel element 252 and remove it from the reactor. The gripper device 312 is actuated pneumatically, and a pneumatic line 314 is attached to the arm 306 to conduct a pressure actuating fluid to the gripper device 312, such as air. A shaft 316 is disposed within the frame 302 of the unloading device 300 parallel to the axis thereof and translatable therein. A positioning arm 318 is pivotally attached to the shaft 316 and to the junction 320 between the arm 306 and the pivot arm 308, as illustrated in Figure 24. The upper extremity of the shaft 316 is provided with a lifting ring 322, and translation of the shaft 316 relative to the frame 302 results in displacing the arm 306 from the axis of the frame 302, as illustrated by the dashed lines in Figure 24. In this manner, any one of the seven fuel elements 252 beneath any particular unloading tube 248 may be serviced, and the fuel elements 252 removed through the confronting tube 248. The unloading device 300 is provided with a coolant tube 324 which conducts water to the fuel elements 252 as they are removed from the reactor to maintain cooling during the operation.

The thermal shield 226, which is disposed within the pressure vessel 222, reduces the neutron and gamma flux and the resultant thermal stresses in the pressure vessel 222. Grids 228 and 230 also serve as thermal shields and protect the pressure vessel 222 from radiation-induced thermal stresses.

A layer of thermal insulating material 326 approximately six inches thick is disposed about the pressure vessel 222, as illustrated in Figure 16, to protect the concrete shield 330 surrounding the reactor from conducted heat and to conserve thermal energy. A steel form 328 for the concrete shield 330 surrounds the layer 326 of insulating material, and the eight-foot thick concrete biological shield 330 surrounds the form 328. The concrete shield 330 is also provided with cooling coils 331 adjacent to its inner periphery to dissipate heat liberated by gamma radiation. A thermal shield consisting of steel plates 332 is disposed above the reactor. As illustrated in Figure 14, a steam separator 348 is disposed exterior to the shield 330 and connected to the aperture 246 in the pressure vessel 222. A steam separator 348 further dries the steam produced by the reactor, and the steam is conducted to a steam turbine and electric generator 350 which converts the energy of the steam to rotational motion and subsequently to electricity in a conventional manner. The steam exhausted from the turbo-generator 350 is then circulated through a condenser 352 which transforms the exhausted steam into heavy water once again. The condenser 352 is provided with a flow of coolant water from a water source 354 by means of a pump 356. The liquefied heavy water is pumped from the condenser 352 by a pump 357 disposed in a shielded well 358 back to the reactor through the pipe 240 and repeats the cycle. In this manner, very little heavy water is lost in the operation of the reactor.

One of the features of the boiling heavy water reactor described above is that it possesses a high degree of safety during operation. This is due to the fact that the formation of steam within the reactor reduces the reactivity of the reactor, and hence there is very little danger of the power of the reactor exceeding permissible operating conditions.

The fifteen control elements 236 are used primarily to determine the power level of the reactor and to provide a safety control in the event unsafe operating conditions develop. The control elements 236 have cadmium sections 360 which are disposed upwardly from the active portion 220 of the reactor in normal operation, the lowering of the control elements 236 introducing the cadmium sections into the active portion 220 of the reactor and diminishing the reactivity thereof. Each of the cadmium portions 360 is in the form of a hollow sleeve approximately ⅜ inch thick, 1½ inches in diameter and 3 feet in length. Any conventional means may be utilized to position the control elements 236 within the reactor and are attached to the end of the control elements 236 extending from the reactor beneath the active portion 220 thereof. A pit 362 is illustrated in Figure 14 to permit ready access to the control mechanism. The control elements 236 are each disposed approximately at the center of a group of three triangularly disposed fuel elements 252, and the control elements 236 are disposed at a distance of approximately 27½ inches from each other throughout the lattice structure, as illustrated in Figure 17.

The following table will summarize the performance of the reactor and associated turbo-generator.

TABLE V

*Plant performance data*

| | |
|---|---|
| Reactor power transferred from cooling surface | 1,000 mw. |
| Total reactor power | 1,060 mw. |
| Maximum fuel element surface temperature in reactor | 545° F. |
| Maximum flux for heat transfer (neutron flux flattened across reactor) | 300,000 B.t.u./hr./sq.ft. |
| Maximum flux for heat transfer (neutron flux unflattened across reactor) | 400,000 B.t.u./hr./sq. ft. |
| Steam temperature | 486° F. |
| Maximum pressure drop in channels | 20 p.s.i. |
| Steam production | 3.8×10⁶ lb./hr. |
| Steam pressure | 600 p.s.i.a. |
| Condenser pressure | 1½ in. Hg. |
| Steam cycle efficiency | 28%. |
| Uranium fuel used per operating day | 0.106 ton. |
| Uranium fuel used per operating year | 31 tons. |
| Number of fuel assemblies used per year | 235. |

As in the first case, the present reactor is controlled by the control elements 236. As in the case of the first embodiment of the present invention, the control elements control the power level directly, rather than controlling the rate of rise or decay of the power level and is conventional in non-boiling reactors.

Figures 26 through 32 illustrate a third construction of the present invention. In this reactor there described, the fuel elements for the reactor consist of U²³⁵, so that inherent stability is not obtained by the increase in resonance absorption of neutrons with the presence of bubbles in the reactor active portion. The moderator for the reactor is water (H₂O) and the dimensions of the reactor are less than 3 feet in all directions, that is, the longest dimension across the core of the reactor is less than 3 feet, so that the reactor will achieve inherent stability principally by an increase in neutron lakage with the formation of bubbles in the water moderator.

As stated above, the reactor 70 illustrated in Figures 1 through 13 achieves a negative reactivity to power characteristic primarily due to the increased resonance absorption of neutrons in U²³⁸ with the increased percentage of volume occupied by steam within the reactor core. However, the reactor 400 illustrated in Figures 26 through 34 contains insufficient U²³⁸ to provide a negative reactivity to power coefficient from this mechanism. This reactor is of sufficiently small size to provide a negative reactivity to power coefficient principally due to the increase in leakage from the reactor core with an increase in bubble formation.

The reactor pressure vessel 402 is disposed within a cavity 404 which is lined by a shield tank 406. The pressure vessel 402 is four feet in diameter and approximately thirteen feet high. A supporting structure 408 constructed principally of concrete surrounds the shield tank 406 and prevents the escape of harmful radiations. A pair of parallel rails 410 are supported on I-beams 411 which are embedded in the supporting structure 408 adjacent to the upper end of the cavity 404, and a control rod drive carriage 412 which supports the control rod drive mechanism 414 rests upon the rails 410 on rollers 416.

The reactor active portion 418 is disposed in the lower portion of the pressure vessel 402 and rests upon a support plate 420. The support plate 420 is provided with a plurality of spaced apertures 422 for accommodating fuel elements 424. Each of the fuel elements 424 contains end plates 426 which are disposed parallel to each other and provided with a plurality of slots 428 on confronting surfaces. A fuel plate 430 is disposed between each pair of confronting slots and contains material fissionable by neutrons of thermal energy, in the particular case U²³⁵. The fuel elements 424 are provided with a mounting nozzle 432 at one end which is adapted to fit slidably within one of the apertures 422 in the support plate 420, in the particular construction the nozzle 432 and aperture 422 having square contours. The other end of the fuel elements 424 are provided with a slotted outlet member 434, the slots 436 in the member being aligned with the channels 438 between adjacent fuel plates 430.

The fuel plates 430 are slightly curved, and a supporting comb shaped rib 440 extends parallel to the end plates 426 to support each of the fuel plates 430.

In the particular construction described, the end plates 426 are constructed of 2S aluminum having a thickness of 0.188 inch, a width of 3.186 inches and a length of 23.625 inches. The side plates 426 are separated by a distance of 2.620 inches. Each of the fuel plates 430 has a length of 23.625 inches, is curved on a radius of 30 inches and has a width of 2.5 inches before curving and a thickness of 0.021 inch. The channel 438 between adjacent plates 430 is 0.117 inch. The plates 430 are provided with an aluminum jacket 441, so that the total length of the fuel elements 424 is 24.625 inches, total width 2.845 inches before curving, and thickness 0.060 inch. The fuel plates 430 contain 13.3% uranium and 86.7% aluminum, the uranium contains 93.5% U²³⁵, and the total U²³⁵ content per plate is 7.70 grams. The aluminum disposed in the fuel plates 430 is 99.75% pure. There are 18 plates 430 in each fuel element 424, thus providing 138.60 grams of U²³⁵ in each fuel element 424.

The reactor core 418 is adapted to accommodate up to 36 fuel elements 424 disposed in four quadrants 441a, 441b, 441c and 441d, the fuel elements 424 on each quadrant being in contact with the adjacent fuel elements 424. The four quadrants are formed by an X-shaped channel 442 with an axis coinciding with the axis of the pressure vessel 402 and which has a width of 1 inch. An upper support plate 444 is mounted on posts 446 on a level adjacent to the upper ends of the fuel elements 424, and the fuel elements 424 extend through a rectangular aperture 445 therein. The fuel elements 424 are secured to the upper support plate 444 by clamps 448 and a grid 449 which is secured to the upper support plate 444 and passes over each of the fuel elements 424.

An X-shaped control rod 450 is translatably disposed at the center of the four quadrants in the gap 442. An extension shaft 452 connects to the X-shaped control rod 450 and extends through a cover 454 sealed to the top of the pressure vessel 402 to the control rod drive mechanism 414. The cover 454 is provided with a seal 456 to prevent leakage of steam through the cover from about the periphery of the extension shaft 452. A guide plate 458 is disposed within the pressure vessel 402 and provided with an aperture through which the shaft 452 is journaled, and is mounted upon brackets 460 secured to the pressure vessel 402. The control rod 450 is shaped in the form of an X, and is formed by four cadmium sheets 462 approximately ¼ inch thick which extend outwardly from the axis of the rod normal to each other. These cadmium sheets 462 are approximately 3½ inches wide each, making the control rod 450 a total of approximately 7 inches across. The entire plates 462 are encased in an aluminum cladding 464, and the aluminum cladding extends upwardly for a distance approximately equal to the length of the cadmium sheets 462 where it is connected to the shaft 452 which is connected to the control mechanism 414. The length of the cadmium sheets 462 is approximately 24 inches. The support plate 420 is disposed above the semi-cylindrical bottom 466 of the pressure vessel 402 by a distance greater than the height of the core, namely, approximately 28 inches, so that the control rod 450 may be lowered to position the cadmium sheets 462 below the core 418 of the reactor and thus increase the reactivity of the active portion of the reactor by positioning the aluminum portions of the X-shaped rod 450 in the active portion of the reactor.

In addition to the control rod 450, there are four cadmium control plates 470 which are disposed between the four quadrants 441a, 441b, 441c and 441d. These plates 470 are also provided with jackets 472 of aluminum and are approximately 70 inches wide and 24 inches long. The plates are connected to shafts 476 which are in turn connected to drive mechanisms similar to that illustrated at 414.

The bottom 466 of the pressure vessel 402 is provided with an orifice 478 which is connected to a source of water, and the pressure vessel 402 is filled with water to the level 480 indicated in Figure 26, this level 480 being just above the upper support plate 420 of the reactor. The lower support plate 420 of the reactor is provided with relatively large apertures 482 which are disposed about the periphery of the plate 420 to aid the water level in rising to the desired height. A water dump valve 484 is mounted into the pressure vessel 402 just below the lower support plate 420 to enable removal of the water from the pressure vessel in the event of an emergency, thus shutting down the neutronic chain reaction within the pressure vessel.

The pressure vessel is also provided with a pair of apertures 486 and 488 adjacent to the cover 454 thereof. One of said apertures is connected to a pipe 490 for conducting steam from the pressure vessel 402. The other of said apertures 488 is closed and sealed by a disc 492 which will rupture if a pressure greater than 700 pounds occurs within the pressure vessel 402.

The reactor illustrated in Figures 26 through 34 may be operated with the steam circulation system and cooling system shown in Figure 11, the reactor 70 being replaced by the reactor illustrated in these figures and designated 400. When used in conjunction with the steam system and cooling system illustrated in Figure 11, the aperture 486 and pipe 490 are connected to the steam separator 159, and the aperture 478 in the bottom 466 of the pressure vessel 402 is connected to one of the valves 170 to refill and replace the water from the pressure vessel 402 as it is converted to steam.

As illustrated in Figure 26, the control rod drive mechanisms 414, only one of the five being illustrated, are mounted to a carriage 412 which is provided with a support plate 500. The shaft 452, which is connected to the control element 450, extends through the cover 454 of the reactor pressure vessel 402, through water-tight bearings 456, and then passes through an aperture 502 in the support plate 500. A cylinder 504 is mounted to the lower side of the support plate 500 and surrounds the shaft 452, and a piston 506 is mounted to the shaft 452 and abuts the cylindrical walls of the cylinder 504. The cylinder 504 is also provided with an aperture 508 adjacent to its lower end and a second aperture 510 adjacent to its upper end, and a source of air pressure 511 is connected to one of these two apertures 508 and 510 through a valve 513, which also exhausts the other port to the ambient atmosphere. An upper mounting plate 512 is mounted above the support plate 500 by a pair of parallel posts 514 mounted to the support plate 500. A pair of parallel threaded screws 516 are journaled in the plate 512 at one end and in the support plate 500 at the other end, one of said screws 516 being disposed on each side of the shaft 452. A disc-shaped stop 518 is disposed parallel to the plate 500 and threadedly engaged with each of the two screws 516. The stop 518 is provided with an aperture 520 centrally thereof, and the shaft 452 is journaled within the aperture 520. A disc 522 is also secured to the shaft 452 above the variable stop 518 and forms a stop when it abuts the variable stop 518.

As illustrated in Figure 28, a motor 524 is provided with a chain 526 which engages spur gears 528 and 530, spur gear 528 being connected to one of the screws 516 and spur gear 520 being connected to the other screw 516. A pair of pulleys 532 are also provided between the motor 524 and the spur gears 528 and 530 to guide the chain 526.

Operation of the motor 526, in either direction, rotates the two screws 516, thereby raising or lowering the variable stop 518, depending upon the direction of rotation of the motor 524. During normal operation, the aperture 510 is connected to the source of air pressure 511, placing a downward thrust upon the shaft 452, thereby causing the stationary stop 522 to abut the variable stop 518. During this operation, the aperture 508 is vented to the atmosphere by the valve 513, so that the variable stop 518 may be moved by action of the motor 524 to raise or lower the shaft 452, upward motion being directly effected by the action of the variable stop and downward motion being directly effected by the action of the pressurized air through aperture 510. Upward motion of the control element 450 decreases the reactivity of the reactor, since raising the control element 452 puts a larger amount of cadmium into the reactor active portion 418, and downward motion of the control element 450 increases the reactivity of the reactor. On the other hand, if an unsafe condition develops, or for some other reason it is desirable to shut down the neutronic reactor, the port 508 of the cylinder 504 is connected to a source of air pressure, and the port 510 is vented to the atmosphere by changing the valve 513 position, thereby driving the shaft 452 and the control element 450 upwardly, thus placing a larger amount of the cadmium section into the reactor active portion 418 and decreasing the reactivity of the reactor. It is to be noted that the patent application of Willard H. McCorkle, Serial No. 226,616, filed May 16, 1951, entitled "Positioning Device," now Patent No. 2,756,857, discloses a somewhat similar control element drive mechanism.

Since the pressure within the reactor will have a tendency to force the shaft 452 out of the reactor, an equalizing force is applied to the outer end of the shaft 452. For this purpose, a sleeve 534 is sealed to the plate 512 and extends coaxially with the shaft 452. The sleeve 534 is provided with an aperture 536 which is connected to the pressure vessel 402 to provide the same pressure therein as exists in the pressure vessel 402.

The reactor 400, after construction, was found to become critical with a total of 26 fuel elements 424 disposed in the active portion 418 of the reactor, these fuel elements 424 being divided with six fuel elements in quadrants 441a and 441d and seven fuel elements in 441b and 441c, the void spaces being disposed adjacent to the periphery of the active portion 418 of the reactor. Under these conditions, the control plates 470 were all removed from the active portion 418 of the reactor, or in other words, lowered to remove the cadmium sections from the active portion of the reactor, and the control element 450 was approximately one-half lowered out of the active portion of the reactor.

This reactor is operated in the manner identical to the reactor shown in Figures 1 through 13. The mass of water within the pressure vessel is first heated to the temperature just below the boiling point of the water, and then the neutronic chain reaction is started. The control rods 450 and 470 are removed from the reactor to permit the reactivity of the reactor to rise and form steam, just as in previous cases it has been found that the reactor may be operated at a reactivity up to 10% greater than the reactivity of the reactor without boiling at a temperature just below the boiling point and a neutron reproduction factor of unity. When operated in a boiling condition with a reactivity approaching 10% reactivity greater than the reactivity required to provide a neutron reproduction ratio of unity at a temperature just below the boiling temperature of the coolant, the neutronic chain reaction is not constant but periodically varies, giving the effect of "chugging." The inventor has found that in this reactor, just as in the previous two reactors, smooth relatively constant power levels are maintained by limiting the reactivity of the reactor in boiling conditions from 0.5 to 4% reactivity greater than the reactivity required to provide a neutron reproduction ratio of unit at a temperature just below the boiling point of the coolant. A suitable operating point was found to be 2% reactivity maintained in bubbles, and 10% of the core volume is in bubbles under this condition.

The fundamental difference between this reactor 40 and the two reactors 70 and 222 previously described as far as its operation as a boiling reactor is concerned is that inherent stability is achieved in this reactor principally as a result of the increase in leakage of neutrons from the reactor active portion responsive to an increase in bubbles within the reactor. The fuel used in the fuel elements 424 of the reactor is principally $U^{235}$, and so little $U^{238}$ is present in the fuel elements that the effect upon reactivity of the resonance absorption of neutrons in the $U^{238}$ with an increase of the bubble content of the active portion of the reactor is insignificant. Because of the small size of the active portion of the reactor, the shortest axis through the reactor being approximately 24 inches, the loss of neutrons from the reaction as a result of diffusion through the mass of water which is disposed within the pressure vessel 402 surrounding the core 418, this mass forming a reflector, is sufficient to provide inherent stability. The inventor has found that at least one dimension of the reactor core must be no greater than 3 feet in order to provide a neutronic reactor in which leakage plays a sufficiently important function than inherent stability can be achieved by the mechanism of increased leakage with increased bubble content within the reactor core alone.

For a reactor to be inherently stable when operated in a boiling condition, the reactor must have a negative reactivity to bubble volume coefficient. The inventor has found that this coefficient must not exceed 0.5% K per percent of void in order to achieve a reactor suitable for power production. Further, particularly good results are obtained if the coefficient is between 0.075 and 0.3% K per percent of bubble volume to total core volume.

It is further to be noted that a reactor suitable for operation to produce steam directly in the core of the reactor can be constructed with any of the known moderators, even though the described reactors use water and heavy water for moderators. For example, beryllium and graphite may be employed as moderators in reactors cooled with a steam forming coolant which are suitable for boiling. However, in the case of a graphite moderated water cooled reactor employing "lumped geometry," care must be exercised to select a fuel lump spacing smaller than that yielding optimum reactivity, since a negative reactivity to steam volume ratio can be obtained in this manner.

From the foregoing disclosure, the man skilled in the art will readily devise many reactors which may be operated in a boiling condition and be inherently stable and which are structurally different from those herein specifically described. Further, many methods of operating a reactor in a boiling condition may be devised from the teachings herein set forth. It is therefore intended that the scope of the present invention be not limited by the foregoing specification, but rather only by the appended claims.

The claimed invention is:

1. The method of safely operating a neutronic reactor having a steam forming coolant in the reactor core, which comprises providing a reactor having a negative reactivity to core void coefficient between 0 and 0.5% K per percent void at the reactor temperature at which the coolant commences boiling, initiating a neutronic chain reaction within the reactor by injecting into the reactor between 0 and 10% reactivity greater than the reactivity required to provide a neutron reproduction ratio of unity at a temperature just below the boiling temperature of the coolant, whereby steam is generated in the core and the reactivity increment is nullified by steam formation in the core, and introducing liquid coolant into the core to compensate for the steam so generated.

2. The method of safely operating a neutronic reactor having a steam forming coolant in the reactor core, which comprises providing a reactor having a negative reactivity to core void coefficient between 0.075 and 0.3% K per percent void at the temperature of the reactor at which the coolant commences boiling, initiating a neutronic chain reaction within the reactor by injecting into the reactor between 0.5% and 4% reactivity greater than the reactivity required to provide a neutron reproduction ratio of unity at a temperature just below the boiling temperature of the coolant whereby steam is generated in the core and the reactivity increment is nullified by steam formation in the core, separating the liquid coolant from the steam produced by the reaction and introducing liquid coolant in the core to compensate for the steam so generated.

3. The method of safely operating a neutronic reactor having a steam forming coolant in the reactor core and a negative reactivity to core void coefficient between 0 and 0.5% K per percent void at the reactor temperature at which the coolant commences boiling, comprising the steps of bringing the reactor core to a temperature just below the boiling temperature of the coolant, then initiating a neutronic chain reaction within the reactor, by injecting into the reactor between 0 and 10% reactivity greater than the reactivity required to provide a neutron reproduction ratio of unity at a temperature just below the boiling temperature of the coolant whereby steam is generated in the core and the reactivity increment is nullified by steam formation in the core, and introducing liquid coolant into the core to compensate for the steam so generated.

4. The method of claim 1 wherein the steam forming liquid is water.

5. The method of claim 1 wherein the steam forming liquid is deuterium oxide.

6. A neutronic reactor comprising a pressure vessel, a reactor core having a mass of steam forming coolant, disposed within the pressure vessel, said core having a plurality of fissionable isotope-containing fuel elements and control means disposed within said mass of steam-forming coolant, the ratio of the volume of steam forming coolant to the volume of fissionable isotopes being within the range yielding a multiplication factor greater than unity and a negative reactivity to core void coefficient when the coolant is boiling, means for producing steam directly in the reactor core, said pressure vessel having a steam dome within the pressure vessel above and directly communicating with said steam forming coolant, and a steam outlet from the steam dome.

7. The reactor of claim 6 wherein the steam forming coolant is $H_2O$.

8. The reactor of claim 6 wherein the steam forming coolant is $D_2O$.

9. A neutronic power producing device comprising, in combination, a pressure vessel having a coolant inlet port and a steam exhaust port, a core disposed within the pressure vessel containing a mass of steam-forming coolant and a plurality of fuel elements disposed within the mass containing fissionable isotopes, a source of coolant connected to the coolant inlet port of the pressure vessel, a steam separator connected to the steam exhaust port of the pressure vessel, a turbo-generator having an inlet port connected to the steam separator and an outlet port, a condenser connected to the outlet port of the turbo-generator, a pressure release valve connected to the steam inlet end of the turbo-generator and to the condenser, and means responsive to the pressure within the pressure vessel to actuate the pressure release valve to maintain a constant pressure within the pressure vessel.

10. A neutronic reactor comprising an elongated-cylindrical pressure vessel having a diameter of approximately 6 feet, a mass of $H_2O$ disposed within the pressure vessel, a plurality of elongated fuel elements immersed in parallel vertical relation within the mass of $H_2O$ forming a core with a diameter of approximately 4½ feet and a height of approximately 4 feet, said fuel elements containing 10 kgs. of $U^{235}$ and 6 tons of uranium with the isotopic content found in nature, and each of said fuel elements being provided with a vertical channel therein, a steam dome disposed above the mass of $H_2O$ in the pressure vessel, and means to remove steam from the steam dome.

11. A neutronic reactor comprising the elements of claim 10 wherein the core comprises 110 fuel elements each having five plates of uranium with the isotopic content found in nature approximately ⅜ inch thick and 48 inches long, each of said plates being clad in zirconium 20 mils thick, and 38 fuel elements each having 48 inch fissionable material sections in three portions, the center 32 inch portion of said section containing 5 plates consisting of 95% zirconium and 5% uranium, said uranium being at least 95% $U^{235}$, and said plates being 80 mils thick and having a 10 mil zirconium cladding, the other two portions of said fuel section being 8 inches long and each containing 5 plates of uranium having the isotopic content found in nature, said plates being approximately 3⅝ inches wide and ⅜ inch thick and clad in 20 mils of zirconium, said 38 fuel elements being approximately uniformly distributed in the reactor core.

12. A neutronic power producing device comprising a pressure vessel having an inlet port for a steam-forming liquid and a steam outlet port, a core disposed within the tank, said core having a mass of the steam-forming liquid disposed therein and a plurality of fuel elements containing material fissionable by thermal neutrons disposed within the mass of liquid, the ratio of liquid mass to fissionable isotopes being within the range yielding a neutron multiplication ratio greater than unity at the boiling temperature of the liquid in the pressure vessel, a steam separator connected to the outlet port, a turbo-generator connected to the steam separator, a throttle valve connected between the turbo-generator and steam separator, and overspeed governor attached to the turbo-generator and mechanically linked to the throttle valve to reduce the flow of steam to the turbine in the event of overspeed of the turbo-generator, and a pressure release valve connected to the inlet end of the turbine and mechanically linked to the overspeed governor, whereby activation of the overspeed governor opens the pressure release valve and closes the throttle valve.

13. A neutronic power producing device comprising a pressure vessel having an inlet port for a steam-forming liquid and a steam outlet port, a core disposed within the tank having material fissionable by thermal neutrons, a source of steam-forming liquid connected to the inlet port, means to separate steam from the steam-forming liquid having an inlet connected to the outlet port of the pressure vessel, said steam separation means having an outlet adapted to be connected to a load, and means to maintain the steam pressure within the pressure vessel below a fixed value including a valve connected to the steam separation means, and means responsive to the flow rate of steam from the outlet of the separation means for actuating said valve.

References Cited in the file of this patent
UNITED STATES PATENTS

| | | |
|---|---|---|
| 2,787,593 | Metcalf | Apr. 2, 1957 |
| 2,806,820 | Wigner | Sept. 17, 1957 |
| 2,825,688 | Vernon | Mar. 4, 1958 |

OTHER REFERENCES

Untermyer: Vol. 12, No. 7, July 1954 of Nucleonics, pages 43–47.

W. H. Zinn: Atomic Industrial Forum Report, July 1954, pages 36–38.

AECD–3840, U.S. Atomic Energy Commission Transient and Steady State Characteristics of a Boiling Reactor. The Borax Experiments (1953), by J. R. Dietrich, D. C. Layman, February 1954. Available from Technical Information Service, Oak Ridge, Tenn. Pages 11–48, 70, 91, 92, 94, 97.

Reports to the U.S. Atomic Energy Commission on Nuclear Power Reactor Technology, vol. 1, May 1953, pages 17–25, 32–38.

Report on the Five-Year Reactor Development Program Proposed by the Atomic Energy Commission, U.S. Gov't. Printing Office (1954), pages 11, 15.